US009842571B2

(12) United States Patent
Hong et al.

(10) Patent No.: US 9,842,571 B2
(45) Date of Patent: Dec. 12, 2017

(54) CONTEXT AWARENESS-BASED SCREEN SCROLL METHOD, MACHINE-READABLE STORAGE MEDIUM AND TERMINAL THEREFOR

(71) Applicant: Samsung Electronics Co., Ltd., Suwon-si, Gyeonggi-do (KR)

(72) Inventors: Hyun-Su Hong, Seongnam-si (KR); Hong-Il Kim, Suwon-si (KR); Joo-Young Son, Suwon-si (KR); Woo-Jin Jung, Seongnam-si (KR); Tae-Hwa Hong, Seoul (KR); Byung-Jun Son, Seoul (KR); Yun-Je Oh, Seongnam-si (KR); Sun-Tae Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 14/180,947

(22) Filed: Feb. 14, 2014

(65) Prior Publication Data

US 2014/0240363 A1    Aug. 28, 2014

(30) Foreign Application Priority Data

Feb. 22, 2013 (KR) .......................... 10-2013-0019486
Jun. 20, 2013 (KR) .......................... 10-2013-0070924

(51) Int. Cl.
*G09G 5/34* (2006.01)
*G06F 3/0485* (2013.01)
*G06F 3/01* (2006.01)

(52) U.S. Cl.
CPC .............. *G09G 5/34* (2013.01); *G06F 3/012* (2013.01); *G06F 3/0485* (2013.01)

(58) Field of Classification Search
None
See application file for complete search history.

(56) References Cited

U.S. PATENT DOCUMENTS

| 2003/0210255 | A1* | 11/2003 | Hiraki ................. G06F 3/04845 345/684 |
| 2006/0001647 | A1* | 1/2006 | Carroll .................. G06F 3/0304 345/156 |
| 2008/0034293 | A1 | 2/2008 | Vaananen |
| 2008/0212834 | A1 | 9/2008 | Oh |
| 2009/0070711 | A1 | 3/2009 | Kwak et al. |
| 2009/0271734 | A1* | 10/2009 | Hsu ......................... G06F 3/011 715/785 |
| 2009/0327950 | A1 | 12/2009 | Kuo |
| 2010/0245277 | A1* | 9/2010 | Nakao ................. G06F 3/04883 345/173 |

(Continued)

FOREIGN PATENT DOCUMENTS

EP    2 293 176 A2    3/2011
JP    11-085452 A    3/1999

(Continued)

*Primary Examiner* — Vu Nguyen
(74) *Attorney, Agent, or Firm* — Jefferson IP Law, LLP

(57) ABSTRACT

A context awareness-based screen scroll method is provided. The method includes detecting information about surrounding circumstances of a terminal, setting a screen scroll mode based on the surrounding circumstances, detecting occurrence of an event corresponding to the set screen scroll mode, and executing screen scroll according to the occurred event.

17 Claims, 29 Drawing Sheets

(56) References Cited

U.S. PATENT DOCUMENTS

| | | | |
|---|---|---|---|
| 2011/0057880 A1* | 3/2011 | Kasahara | G06F 1/1626 345/158 |
| 2012/0050273 A1 | 3/2012 | Yoo et al. | |
| 2012/0194531 A1 | 8/2012 | Yanagawa | |
| 2012/0200498 A1 | 8/2012 | Quennesson | |
| 2012/0256967 A1* | 10/2012 | Baldwin | G06F 3/013 345/684 |
| 2012/0302288 A1* | 11/2012 | Born | H04M 1/04 455/557 |

FOREIGN PATENT DOCUMENTS

| | | |
|---|---|---|
| JP | 2012-160006 A | 8/2012 |
| KR | 10-2007-0054569 A | 5/2007 |
| KR | 10-0873679 B1 | 12/2008 |
| KR | 10-2012-0074510 A | 7/2012 |
| KR | 10-2012-0139893 A | 12/2012 |

* cited by examiner

CONTEXT AWARENESS-BASED SCREEN SCROLL METHOD, MACHINE-READABLE STORAGE MEDIUM AND TERMINAL THEREFOR

CROSS-REFERENCE TO RELATED APPLICATION(S)

This application claims the benefit under 35 U.S.C. §119 (a) of a Korean patent application filed on Feb. 22, 2013 in the Korean Intellectual Property Office and assigned Serial No. 10-2013-0019486, and a Korean patent application filed on Jun. 20, 2013 in the Korean Intellectual Property Office and assigned Serial No. 10-2013-0070924, the entire disclosure of which both of which is hereby incorporated by reference.

TECHNICAL FIELD

The present disclosure relates generally to a terminal. More particularly, the present disclosure relates to a method for controlling screen scroll in a terminal.

BACKGROUND

An electronic device controlled by a user may include at least one display device, and the user may control the electronic device through an input device while watching various operating states of the electronic device or operations of applications on the display device. In particular, a mobile terminal manufactured for convenient portability, such as a cellular phone, may have, due to its limited size, an input device (e.g., a touch screen) with which the user may make an input on the touch screen, instead of having a four-way button used for manipulating the up, down, left and right movements, thereby providing user interfaces.

For example, a mobile terminal may move list items using a screen scroll in a list view state in which the mobile terminal displays a plurality of related items such as received/sent Short Message Service (SMS) message items and address book items, in the form of multiple bars, multiple boxes, or multiple icons. When user interfaces are provided on a touch screen, a user may move the list items to a desired point by making a drag (i.e., an operation or gesture in which, while touching one point of the touch screen with a finger or a stylus pen, the user moves the finger or stylus pen to another point and releases the touch after stopping the movement) or a flick (i.e., an operation or gesture in which, after touching one point of the touch screen with a finger or a stylus pen, the user releases the touch while quickly moving the finger or stylus pen in any direction). Upon receiving a drag input, the mobile terminal may perform a screen scroll operation in a list view state depending on the direction and moving state corresponding to the drag input. Upon receiving a flick input, the mobile terminal may quickly perform screen scroll at a speed and in a direction corresponding to the flick input, gradually reduce the speed of screen scroll, and then stop the screen scroll.

In this case, however, if there are a large number of list items, the user needs to continuously perform the drag or flick operation several times to reach a desired list item, which is an inconvenience for the user. If the user wants to slowly check list items, the user needs to touch one point of the touch screen with a finger, and then, slowly move the finger at a speed corresponding thereto. Particularly, in the case of a device with a small display, such as a mobile terminal, the screen may be often covered or blocked with the finger since the touch screen needs to be used as both a touch input unit and a display unit.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for allowing a user to more conveniently scroll a screen with simple manipulation.

Another aspect of the present disclosure is to provide a method for preventing unintended scroll errors in a vision scroll mode or a motion scroll mode.

In accordance with an aspect of the present disclosure, a context awareness-based screen scroll method is provided. The method includes detecting information about surrounding circumstances of a terminal, setting a screen scroll mode based on the surrounding circumstances, detecting occurrence of an event corresponding to the set screen scroll mode, and executing screen scroll according to the occurred event.

The screen scroll mode may include at least one of a vision scroll mode based on a camera module, a motion scroll mode based on a sensor module, and a voice scroll mode based on an input/output module.

The screen scroll may include at least one of scroll-up, scroll-down, scroll-right and scroll-left.

The detecting of the information about surrounding circumstances may include determining whether the terminal is fixed, or determining whether ambient illuminance of the terminal is greater than or equal to a threshold.

The detecting of the information about surrounding circumstances may include determining whether the terminal is physically connected to a peripheral device or determining whether the terminal is left unattended.

The vision scroll mode may be set if the terminal is fixed, and the motion scroll mode may be set if the terminal is not fixed.

The vision scroll mode may be set if ambient illuminance of the terminal is greater than or equal to a threshold, and the motion scroll mode may be set if the ambient illuminance of the terminal is less than the threshold.

The vision scroll mode may be set if the terminal is fixed or ambient illuminance of the terminal is greater than or equal to a threshold, and the motion scroll mode may be set if the ambient illuminance of the terminal is less than the threshold.

The detecting of the occurrence of an event may include determining whether a pre-registered subject is detected from an image captured by a camera module, and determining whether a change in position of the detected subject exceeds a threshold in continuously captured images.

The registered subject may be a face.

The detecting of the occurrence of an event may include determining whether a pre-registered subject is detected from an image captured by a camera module, and determining whether a change in position or angle of the terminal exceeds a threshold.

The context awareness-based screen scroll method may further include stopping the screen scroll if the terminal moves or is tilted in a direction toward an initial position or an initial angular position before the change in position.

The detecting of the occurrence of an event may include detecting a face in an image, detecting an interest region including a nose from the detected face, and detecting a moving state of the interest region depending on a moving direction of the interest region, wherein the screen scroll is executed depending on the moving state of the interest region.

The image may be an image that is not processed by an Image Signal Processor (ISP).

The image may be a down-sampled monochrome or gray-scale image.

The context awareness-based screen scroll method may further include determining whether the face in the image is located in an optimal region of the screen, and outputting guide information if the face in the image is not located in the optimal region of the screen.

A center of the optimal region may be spaced apart from a center of the screen in a direction far from a camera module.

If the interest region is in a stop state, the stop state may be maintained for a time or during a number of image frames.

The moving state of the interest region may be determined, if the interest region has moved and stopped for a time or during a number of image frames.

The moving state of the interest region may be determined if the interest region has moved and stopped for a time or during a number of image frames, after the stop state of the interest region was maintained for a time or during a number of image frames.

A threshold for determining a current moving state of the interest region may be dynamically changed depending on a change in position of the interest region in a previous moving state.

A threshold for determining a current moving state of the interest region may be determined depending on a range to which a change in position of the interest region in the previous moving state belongs among ranges for a change in position.

The current moving state and the previous moving state may be in opposite directions.

In accordance with another aspect of the present disclosure, a terminal for providing context awareness-based screen scroll is provided. The terminal includes a display unit configured to provide a screen, and a controller configured to detect information about surrounding circumstances of the terminal, to set a screen scroll mode based on the surrounding circumstances, to detect occurrence of an event corresponding to the set screen scroll mode, and to execute screen scroll according to the occurred event.

The terminal may further include a camera module configured to output a captured image, wherein the controller executes screen scroll if a registered subject is detected from the captured image.

The controller may determine whether a change in position of the detected subject exceeds a threshold in images which are continuously captured by the camera module.

The terminal may further include a sensor module for detecting a change in position or angle of the terminal, wherein the controller determines whether a change in position or angle of the terminal exceeds a threshold.

The registered subject may be a face.

The terminal may further include an input/output module for detecting a user's voice, wherein the screen scroll mode includes at least one of a vision scroll mode based on the camera module, a motion scroll mode based on the sensor module, and a voice scroll mode based on the input/output module.

In accordance with further another aspect of the present disclosure, a terminal for providing context awareness-based screen scroll is provided. The terminal includes a display unit configured to provide a screen, a camera module configured to output a captured image, and a controller configured to determine whether a face is detected from the captured image, and, if the face is detected from the captured image, to detect a tilt of the terminal and execute screen scroll based on a tilt direction of the terminal.

The controller may execute screen scroll if a tilt angle of the terminal is greater than or equal to a threshold.

The controller may scroll up the screen if the terminal is tilted forward, and scroll down the screen if the terminal is tilted backward.

The controller may stop the screen scroll if the terminal is tilted in an opposite direction to the tilt direction.

The controller may stop the screen scroll if the terminal is tilted in an opposite direction to the tilt direction at a threshold angle or more.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the present disclosure, a terminal may be any device equipped with a touch screen, and the terminal may be referred to as a portable terminal, a mobile terminal, a communication terminal, a portable communication terminal, a portable mobile terminal, or the like.

For example, a terminal may be at least one of a smart phone, a cellular phone, a game console, a Television (TV), a display device, a car head unit, a notebook computer, a laptop computer, a tablet computer, a Personal Multimedia Player (PMP), a Personal Digital Assistants (PDA), or the like. The terminal may be implemented as a pocket-sized portable communication terminal having a wireless communication function. Furthermore, the terminal may be a flexible device or a flexible display device.

A typical configuration of the terminal may correspond to a configuration of a cellular phone, and in the typical configuration of the terminal, some components may be omitted or changed as needed.

Figure 1:
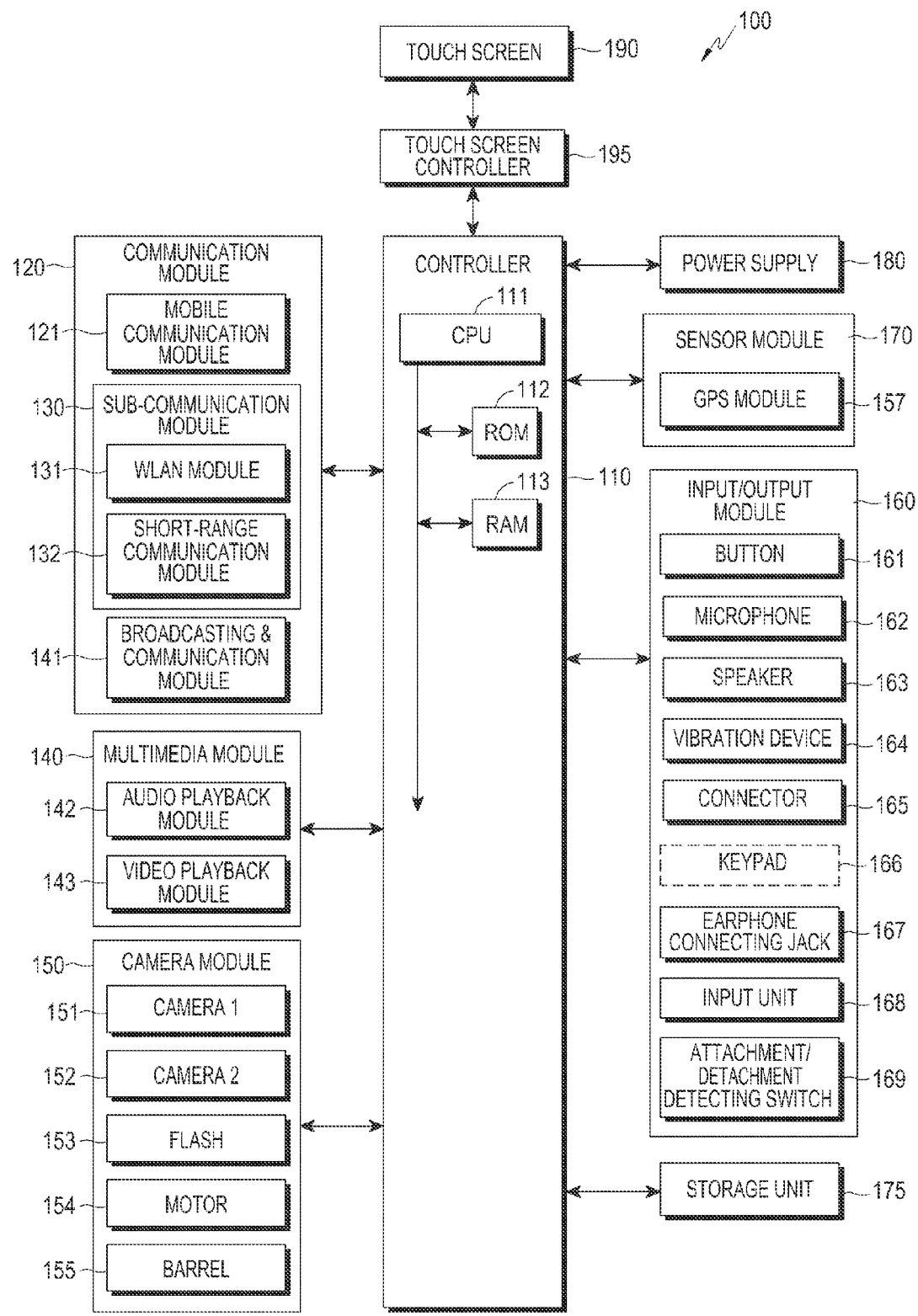
FIG. 1 is a schematic block diagram illustrating a mobile terminal according to an embodiment of the present disclosure.

FIG. 1 is a schematic block diagram illustrating a mobile terminal according to an embodiment of the present disclosure.

Referring to FIG. 1, a mobile terminal 100 may be connected to external electronic devices (not shown) using at least one of a communication module 120, a connector 165, and an earphone jack 167. The electronic devices may include any of a variety of devices such as an earphone, an external speaker, a Universal Serial Bus (USB) memory, a charger, a cradle/dock, a Digital Multimedia Broadcasting (DMB) antenna, mobile payment-related devices, healthcare devices (e.g., a blood glucose meter, and the like), a game console, a car navigation device, and the like, each of which may be detachably connected to the mobile terminal 100, such as by a wire. In addition, the electronic devices may include at least one of a Bluetooth device, a Near Field Communication (NFC) device, a WiFi Direct device, a wireless Access Point (AP), and the like, all of which may be wirelessly connected to the mobile terminal 100. The mobile terminal 100 may be connected to another mobile terminal or any electronic device (e.g., a cellular phone, a smart phone, a tablet Personal Computer (PC), a desktop PC, a server, or the like.) by wire or wirelessly.

The mobile terminal 100 may include at least one touch screen 190 and at least one touch screen controller 195. Further, the mobile terminal 100 may include a controller 110, the communication module 120, a multimedia module 140, a camera module 150, an Input/Output (I/O) module 160, a sensor module 170, a storage unit 175, and a power supply 180.

The communication module 120 may include a mobile communication module 121, a sub-communication module 130 and a broadcasting & communication module 141.

The sub-communication module 130 may include at least one of a Wireless Local Area Network (WLAN) module 131 and a short-range communication module 132, and the multimedia module 140 may include at least one of an audio playback module 142 and a video playback module 143. The camera module 150 may include at least one of a first camera 151 and a second camera 152. Besides, depending on the main purpose of the mobile terminal 100, the camera module 150 of the mobile terminal 100 may include at least one of a barrel 155 for zoom in/out of the first and/or second cameras 151 and 152, a motor 154 for controlling zoom in/out movement of the barrel 155, and a flash 153 for providing a light source for shooting. The I/O module 160 may include at least one of a button 161, a microphone 162, a speaker 163, a vibration device 164, the connector 165, and a keypad 166.

The controller 110 may include a Central Processing Unit (CPU) 111, a Read Only Memory (ROM) 112 storing a control program for control of the mobile terminal 100, and a Random Access Memory (RAM) 113 that temporarily stores signals or data received from the outside of the mobile terminal 100, or is used as a workspace for operations performed in the mobile terminal 100. The CPU 111 may include a single-core CPU, a dual-core CPU, a triple-core CPU or a quad-core CPU. The CPU 111, the ROM 112 and the RAM 113 may be interconnected through an internal bus.

The controller 110 may control the communication module 120, the multimedia module 140, the camera module 150, the I/O module 160, the sensor module 170, the storage unit 175, the power supply 180, the touch screen 190, and the touch screen controller 195.

The controller 110 may detect a user input generated when a user input means, such as the input unit 168, a user's finger, or the like touches, approaches, or is located close to any one object while a plurality of objects or items are displayed on the touch screen 190, and the controller 110 may identify an object corresponding to the position on the touch screen 190, where the user input has occurred. The user input made through the touch screen 190 may include at least one of a direct touch input made by directly touching an object, and a hovering input or an indirect touch input made by approaching an object within a recognition distance instead of directly touching the object. For example, if the input unit 168 is located close to the touch screen 190, an object, which is located vertically under the input unit 168, may be selected. In addition to the user input made through the touch screen 190, the user input in the present disclosure may include a gesture input made through the camera module 150, a switch/button input made through the buttons 161 or the keypad 166, and a voice input made through the microphone 162.

An object or an item (or a function item), which is or may be displayed on the touch screen 190 of the mobile terminal 100, may represent at least one of, for example, an application, a menu, a document, a widget, a photo, a video, an Email, an Short Message Service (SMS) message, a Multimedia Messaging Service (MMS) message, and the like, and may be selected, executed, deleted, canceled, stored or changed by the user input means. The item may be construed to include a button, an icon (or a shortcut icon), a thumbnail image, or a folder in which the mobile terminal 100 may store at least one object. The item may be displayed in the form of an image, a text, or the like.

The shortcut icon is an image that is displayed on the touch screen 190 of the mobile terminal 100, for fast execution of an associated application, or of a call, a contact number, a menu, or the like provided by default in the mobile terminal 100, and if a command or selection for executing the shortcut icon is input, its associated application may be executed.

The controller 110 may detect a user input event such as a hovering event, as the input means approaches the touch screen 190 or is located close thereto. In an embodiment, the controller 110 detects the user input through signaling received from the input unit 168.

If a user input event occurs for an item, the controller 110 may operate or execute a program corresponding to the user input event.

The controller 110 may output a control signal to the input unit 168 or the vibration device 164. The control signal may include information about a vibration pattern, and the input unit 168 or the vibration device 164 may generate vibrations corresponding to the vibration pattern. The information about the vibration pattern may represent the vibration pattern itself, an identifier of the vibration pattern, or the like. Otherwise, the control signal may merely include a request to generate vibrations.

Depending on its performance, the mobile terminal 100 may include at least one of the mobile communication module 121, the WLAN module 131 and the short-range communication module 132.

The mobile communication module 121, under control of the controller 110, may connect the mobile terminal 100 to an external electronic device by mobile communication using one or multiple antennas (not shown). The mobile communication module 121 may transmit and receive wireless signals for voice calls, video calls, SMS messages, MMS messages, or the like, to/from a cellular phone (not shown), a smart phone (not shown), a tablet PC (not shown) or another electronic device (not shown). In an embodiment, phone numbers of any or all of such devices may be entered or registered in the mobile terminal 100.

The sub-communication module 130 may include at least one of the WLAN module 131 and the short-range communication module 132. For example, the sub-communication module 130 may include any one or both of the WLAN module 131 and the short-range communication module 132.

The WLAN module 131, under control of the controller 110, may access the Internet in a location where a wireless AP (not shown) is installed. The WLAN module 131 may support the WLAN standard IEEE802.11x defined by Institute of Electrical and Electronics Engineers (IEEE). The short-range communication module 132, under control of the controller 110, may enable wireless short-range communication between the mobile terminal 100 and external electronic devices. The short-range communication scheme may include Bluetooth, Infrared Data Association (IrDA), WiFi-Direct, NFC, or the like.

Through the sub-communication module 130, the controller 110 may transmit a control signal corresponding to a vibration pattern to the input unit 168.

The broadcasting & communication module 141, under control of the controller 110, may receive broadcast signals (e.g., TV broadcast signals, radio broadcast signals, or data broadcast signals) and additional broadcast information (e.g., an Electronic Program Guide (EPS) or an Electronic Service Guide (ESG)) sent from broadcasting stations via a broadcasting & communication antenna (not shown).

The multimedia module 140 may include the audio playback module 142 or the video playback module 143. The audio playback module 142, under control of the controller 110, may play digital audio files (with a file extension of, for example, mp3, wma, ogg or wav) that are stored in the storage unit 175 or received from the outside of the mobile terminal 100. The video playback module 143, under control of the controller 110, may play digital video files (with a file extension of, for example, mpeg, mpg, mp4, avi, mov, or mkv) that are stored in the storage unit 175 or received from the outside of the mobile terminal 100.

The multimedia module 140 may be incorporated into the controller 110.

The camera module 150 may include at least one of the first and second cameras 151 and 152 which may capture or shoot still images or videos under control of the controller 110. In addition, the camera module 150 may include at least one of the barrel 155 for performing zoom in/out to shoot a subject, the motor 154 for controlling movement of the barrel 155, and the flash 153 for providing a secondary light source needed to shoot a subject. The first camera 151 may be disposed on the front of the mobile terminal 100, and the second camera 152 may be disposed on the rear of the mobile terminal 100.

The first and second cameras 151 and 152 may each include a lens system, an image sensor and the like. The first and second cameras 151 and 152 may each convert an optical image signal received via (or captured by) the lens system into an electrical image signal (or a digital image), and output the electrical image signal to the controller 110, and the user may capture videos or still images using the first and second cameras 151 and 152.

The I/O module 160 may include at least one of the at least one button 161, the at least one microphone 162, the at least one speaker 163, the at least one vibration device 164, the connector 165, the keypad 166, the earphone jack 167, and the input unit 168. The I/O module 160 is not limited to these components, and may include control devices such as a mouse, a trackball, a joystick or cursor arrow keys, used to control movement of the cursor on the touch screen 190.

The at least one button 161 may be formed on the front, side or rear of the housing (or case) of the mobile terminal 100, and may include at least one of a Power/Lock button, a Volume button, a Menu button, a Home button, a Back button, a Search button, and the like.

The microphone 162, under control of the controller 110, may generate an electrical audio signal by receiving or picking up voice or sound.

The speaker 163, under control of the controller 110, may output a sound corresponding to various signals or data (e.g., wireless data, broadcast data, digital audio data, digital video data or the like) to the outside of the mobile terminal 100. The speaker 163 may output a sound (e.g., call button manipulation tones, ring back tones, the other party's voice, or the like) corresponding to a function executed by the mobile terminal 100. One or multiple speakers 163 may be formed in a position or positions of the housing of the mobile terminal 100.

The vibration device 164, under control of the controller 110, may convert an electrical signal into mechanical vibrations. For example, the mobile terminal 100 in vibration mode may enable the vibration device 164 to operate upon receiving a voice or video call from another device (not shown). One or multiple vibration devices 164 may be formed in the housing of the mobile terminal 100. The vibration device 164 may operate in response to a user input made through the touch screen 190.

The connector 165 may be used as an interface for connecting the mobile terminal 100 to an external electronic device or a power source (not shown). The controller 110 may transmit data stored in the storage unit 175 of the mobile terminal 100 to the external electronic device or receive data from the external electronic device, via a wired cable connected to the connector 165. The mobile terminal 100 may receive power from a power source or charge its rechargeable battery (not shown) with the power source, via a wired cable connected to the connector 165.

The keypad 166 may receive key inputs from the user, for control of the mobile terminal 100. The keypad 166 may include a physical keypad (not shown) formed on the mobile terminal 100 or a virtual keypad (not shown) displayed on the touch screen 190. The physical keypad formed on the mobile terminal 100 may be optional depending on the performance or structure of the mobile terminal 100.

An earphone (not shown) may be inserted in the earphone jack 167, and connected to the mobile terminal 100.

The input unit 168 may be kept inside the mobile terminal 100 after being inserted therein, and may be pulled out or separated from the mobile terminal 100 during its use. An attachment/detachment detecting switch 169 operating in response to attachment/detachment of the input unit 168 may be mounted in a specific region inside the mobile terminal 100, in which the input unit 168 is inserted, and the attachment/detachment detecting switch 169 may output a signal corresponding to the attachment/detachment of the input unit 168 to the controller 110. The attachment/detachment detecting switch 169 may be configured to be in direct/indirect contact with the input unit 168 when the input unit 168 is inserted in the mobile terminal 100. Based on whether it is in contact with the input unit 168, the attachment/detachment detecting switch 169 may generate a signal (e.g., a signal for notifying the attachment/detachment of the input unit 168) corresponding to the attachment/detachment of the input unit 168, and output the generated signal to the controller 110.

The sensor module 170 may include at least one sensor for detecting a state of the mobile terminal 100. For example, the sensor module 170 may include at least one of a proximity sensor for detecting whether the user is in proximity to the mobile terminal 100, an illuminance sensor for detecting the amount of light around the mobile terminal 100, a gyroscope for detecting a rotational movement of the mobile terminal 100, an accelerometer for detecting an accelerated movement of the mobile terminal 100, a motion sensor for detecting movement (e.g., rotation, acceleration or vibration) of the mobile terminal 100, a geo-magnetic sensor for detecting the 'point of the compass' of the mobile terminal 100 using the Earth's magnetic field, a gravity sensor for detecting the direction of gravity, an altimeter for detecting the altitude by measuring the atmospheric pressure, a Global Positioning System (GPS) module 157, and the like.

In addition, the sensor module 170 may include first and second distance/biological sensors (not shown).

The first distance/biological sensor may be disposed on the front of the mobile terminal 100, and may include a first infrared light source and a first infrared camera. The first infrared light source may output an infrared ray, and the first infrared camera may detect the infrared ray reflected from a subject. For example, the first infrared light source may be comprised of a Light Emitting Diode (LED) array in a matrix structure.

For example, the first infrared camera may include a filter for passing the infrared ray and blocking a wavelength band other than that of the infrared ray, a lens system for focusing the infrared rays that have passed the filter, and an image sensor for converting an optical image formed by the lens system into an electrical image signal. For example, the image sensor may be comprised of a Photo-Diode (PD) array in a matrix structure.

The second distance/biological sensor may be disposed on the rear of the mobile terminal 100. The second distance/biological sensor may have substantially the same structure as that of the first distance/biological sensor, and may include a second infrared light source and a second infrared camera.

The GPS module 157 may receive radio waves from a plurality of GPS satellites (not shown) in Earth orbit, and calculate the location of the mobile terminal 100 based on Time of Arrival (ToA) of radio waves from the GPS satellites to the mobile terminal 100.

The storage unit 175, under control of the controller 110, may store signals or data, which are input/output depending on the operation of the communication module 120, the multimedia module 140, the camera module 150, the I/O module 160, the sensor module 170, or the touch screen 190. The storage unit 175 may store a control program for control of the mobile terminal 100 or the controller 110, and a variety of applications.

The term 'storage unit' may refer to any data storage device, such as the storage unit 175, the ROM 112 or the RAM 113 in the controller 110, or a memory card (e.g., Secure Digital (SD) card, a memory stick, or the like) mounted in the mobile terminal 100. The storage unit 175 may include non-volatile memory, volatile memory, a Hard Disk Drive (HDD), a Solid State Drive (SSD), or the like.

The storage unit 175 may store a variety of applications such as navigation, video call, game, time-based alarm applications, and the like, images for providing Graphical User Interfaces (GUIs) associated with the applications, user information, documents, databases or data associated with the context awareness-based screen scroll method, documents, background images (for menu screens, standby screens, and the like) or operational programs needed to drive the mobile terminal 100, and images captured by the camera module 150.

Furthermore, the storage unit 175 may store a program and related data for executing the context awareness-based screen scroll method according to an embodiment of the present disclosure.

The storage unit 175 may be a machine (e.g., computer)-readable medium, and the term 'machine-readable medium' may be defined as a medium that provides data to a machine so that the machine may execute a specific function. The storage unit 175 may include non-volatile media and volatile media. All of the media should be configured such that commands carried by the media may be detected by a physical mechanism that reads out the commands with the machine.

The machine-readable media may, though is not limited to, include at least one of floppy disk, flexible disk, hard disk, magnetic tape, Compact Disc Read-Only Memory (CD-ROM), optical disk, punch card, paper tape, RAM, Programmable Read-Only Memory (PROM), Erasable PROM (EPROM), and FLASH-EPROM.

The power supply 180, under control of the controller 110, may supply power to one or multiple rechargeable batteries mounted in the housing of the mobile terminal 100. The one or multiple rechargeable batteries may supply power to the mobile terminal 100. The power supply 180 may supply power received from the external power source to the mobile terminal 100, via a wired cable connected to the connector 165. The power supply 180 may supply to the mobile terminal 100 the power that is wirelessly received from the external power source by wireless charging technology.

The mobile terminal 100 may include at least one touch screen 190 that provides GUIs corresponding to various services (e.g., calls, data transmission, broadcasting, shooting, and the like), for the user.

The touch screen 190 may output, to the touch screen controller 195, an analog signal corresponding to at least one user input that is input to the GUI.

The touch screen 190 may receive at least one user input through the user's body (e.g., fingers including the thumb) or the input unit 168 (e.g., a stylus pen, an electronic pen, or the like).

The touch screen 190 may receive a continuous movement of one touch (i.e., a drag input). The touch screen 190 may output an analog signal corresponding to the received continuous movement of a touch, to the touch screen controller 195.

In an embodiment of the present disclosure, the touch may include not only a contact touch (or direct touch) between the touch screen 190 and the finger or the input means, but also a non-contact touch (or indirect touch) that is detected if the user input means is located over the touch screen 190 within a recognition distance (e.g., 5 cm) at which the touch screen 190 may detect the user input means without direct contact. The distance or gap, at which the touch screen 190 may recognize the user input unit, is subject to change depending on the performance or structure of the mobile terminal 100. The touch screen 190 may be configured to separately detect a direct touch event and an indirect touch event (i.e., a hovering event) between the touch screen 190 and the user input means, so as to differently output the values (e.g., analog voltage values, current values, or the like) detected by the direct touch event and the hovering event.

The touch screen 190 may be implemented in, for example, a resistive type, a capacitive type, an infrared type, an acoustic wave type, or a combination thereof.

The touch screen 190 may include at least two touch screen panels capable of detecting an input means such as a finger input and a pen input, respectively, making it possible to separately detect an input (i.e., the finger input) by a passive-type first user input means (e.g., a part of the body, such as a finger) and an input (i.e., the pen input) by the input unit 168 which is an active-type second user input means. The passive-type user input means and the active-type user input means may be distinguished depending on whether the user input means may generate or induce energy of electro-magnetic waves, radio waves, or the like. The at least two touch screen panels may provide different output values to the touch screen controller 195, and the touch screen controller 195 may differently recognize the values received from the at least two touch screen panels, and determine whether the input from the touch screen 190 is an input by the finger, or an input by the input unit 168. For example, the touch screen 190 may have a combined structure of a capacitive-type touch screen panel and an Electro-Magnetic Resonance (EMR)-type touch screen panel. As described above, since the touch screen 190 may be configured to include touch keys such as a Menu button 161b and a Back button 161c, the finger input mentioned in the present disclosure or the finger input on the touch screen 190 may include touch inputs on these touch keys.

The touch screen controller 195 may convert an analog signal received from the touch screen 190 into a digital signal, and provide the digital signal to the controller 110.

The controller 110 may control the touch screen 190 using the digital signal received from the touch screen controller 195. For example, the controller 110 may enable a shortcut icon (not shown) and an object displayed on the touch screen 190 to be selected or executed in response to a direct touch event or a hovering event. The touch screen controller 195 may be incorporated into the controller 110.

The touch screen controller 195 may determine not only a user input position but also a hovering gap or distance by detecting the values (e.g., current values or the like) output from the touch screen 190, convert the determined distance value into a digital signal (e.g., Z coordinates), and provide the digital signal to the controller 110. In addition, the touch screen controller 195 may determine the pressure at which the user input means presses the touch screen 190, by detecting the values (e.g., current values or the like) output from the touch screen 190, convert the determined pressure value into a digital signal, and provide the digital signal to the controller 110.

Figure 2:
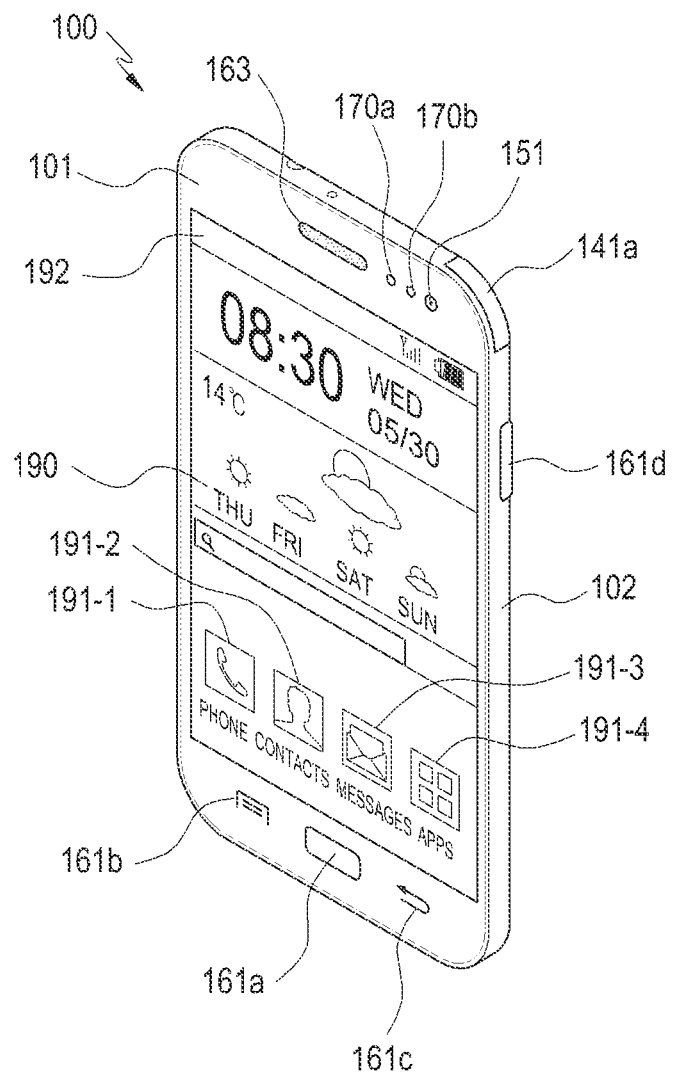
FIG. 2 is a front perspective view of a mobile terminal according to an embodiment of the present disclosure.
Figure 3:
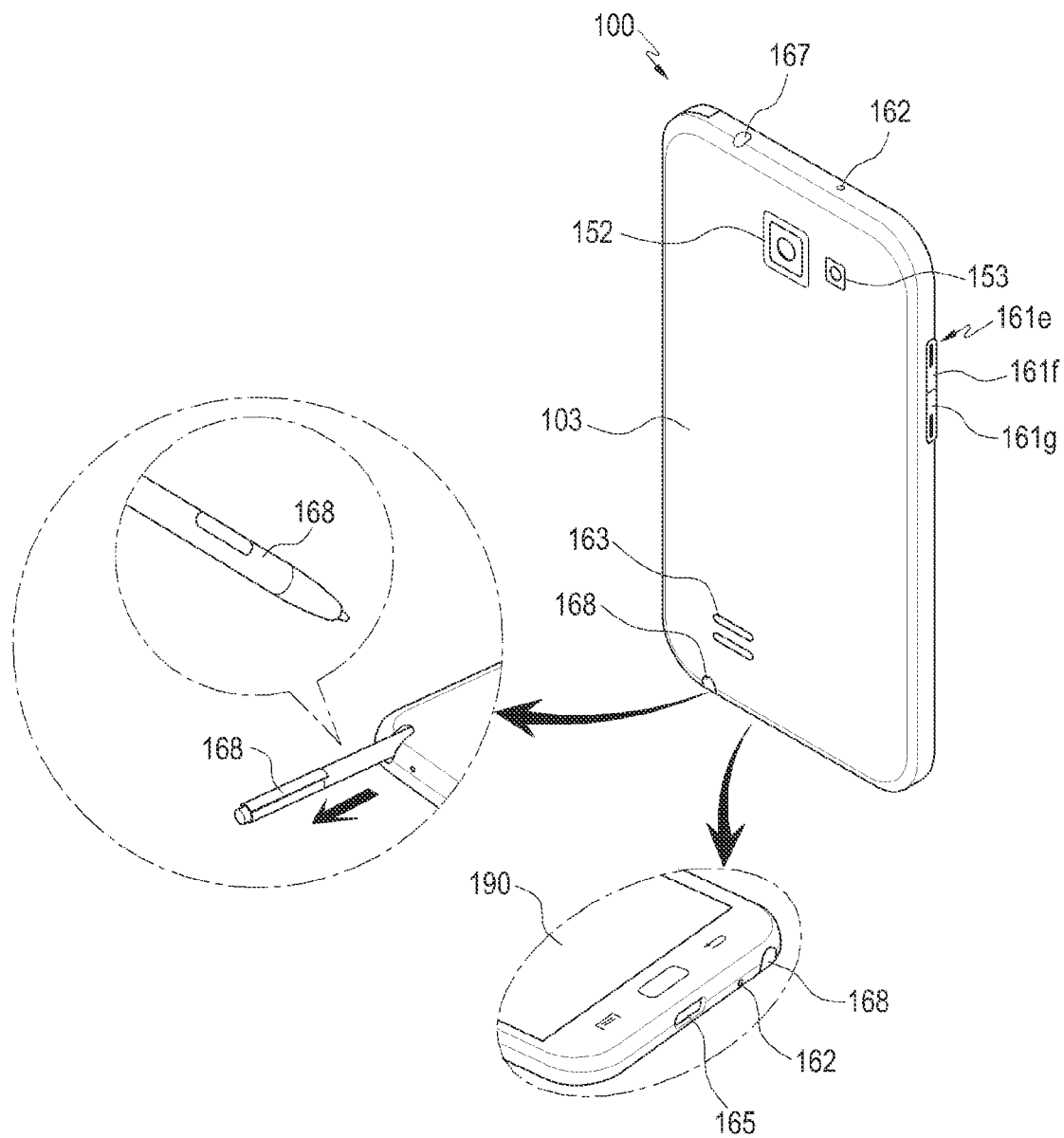
FIG. 3 is a rear perspective view of a mobile terminal according to an embodiment of the present disclosure.

FIG. 2 is a front perspective view of a mobile terminal according to an embodiment of the present disclosure, and FIG. 3 is a rear perspective view of a mobile terminal according to an embodiment of the present disclosure.

Referring to FIGS. 2 and 3, the touch screen 190 is disposed in the center of a front 101 of the mobile terminal 100. The touch screen 190 may be formed large enough to occupy most of the front 101 of the mobile terminal 100. In the example of FIG. 2, a main home screen is displayed on the touch screen 190. The main home screen may be the first screen that is displayed on the touch screen 190 when the mobile terminal 100 is powered on. If the mobile terminal 100 has different home screens of several pages, the main home screen may be the first home screen among the home screens of several pages. On the home screen may be displayed shortcut icons 191-1, 191-2 and 191-3 for executing frequently used applications, a 'switch-to-main menu' key (or a main menu key) 191-4, the current time, the weather or the like. If the user selects the 'switch-to-main menu' key 191-4, a menu screen may be displayed on the touch screen 190. On the top of the touch screen 190 may be formed or displayed a status bar 192 indicating states of the mobile terminal 100, such as a battery level, received signal strength and the current time. The screen may correspond to the surface of the touch screen 190, or an image shown on the surface.

Under the touch screen 190 may be formed touch keys or mechanical buttons such as a Home button 161*a*, the Menu button 161*b* and the Back button 161*c*, or a combination thereof. The touch keys may be configured as part of the touch screen 190.

The Home button 161*a* may be used to display the main home screen on the touch screen 190. For example, if the Home button 161*a* is selected while any home screen different from the main home screen, or a menu screen is displayed on the touch screen 190, the main home screen may be displayed on the touch screen 190. If the Home button 161*a* is selected while one or more applications are executed on the touch screen 190, the main home screen shown in FIG. 2 may be displayed on the touch screen 190. The Home button 161*a* may be used to display recently used applications on the touch screen 190, or to display a task manager.

The Menu button 161*b* may be used to provide connection menus that can be displayed on the touch screen 190. The connection menus may include an Add Widget menu, a Change Wallpaper menu, a Search menu, an Edit menu, a Preferences menu, and the like.

The Back button 161*c* may be used to display the screen preceding the current screen, or to exit the most recently used application.

On an upper part of the front 101 of the mobile terminal 100 may be disposed the first camera 151, an illuminance sensor 170*a*, a proximity sensor 170*b*, and a first distance/biological sensor (not shown). On a rear 103 of the mobile terminal 100 may be disposed the second camera 152, the flash 153, the speaker 163, and a second distance/biological sensor (not shown).

On sides 102 of the mobile terminal 100 may be disposed, for example, a Power/Lock button 161*d*, a Volume button 161*e* having a Volume Up button 161*f* and a Volume Down button 161*g*, a terrestrial DMB antenna 141*a* for broadcast reception, and one or multiple microphones 162. The DMB antenna 141*a* may be formed to be detachably fixed to the mobile terminal 100.

The connector 165 may be formed in a bottom side of the mobile terminal 100. A plurality of electrodes may be formed in the connector 165, and connected to the external devices by wires. The earphone jack 167 may be formed in a top side of the mobile terminal 100. An earphone (not shown) may be inserted in the earphone jack 167.

The input unit 168 may be mounted in a bottom side of the mobile terminal 100. The input unit 168 may be kept inside the mobile terminal 100 after being inserted, and may be pulled out or separated from the mobile terminal 100 during its use.

The controller 110 may control the overall operation of the mobile terminal 100. In accordance with an embodiment of the present disclosure, the controller 110 may control other components in the mobile terminal 100 to perform the context awareness-based screen scroll method.

Figure 4:
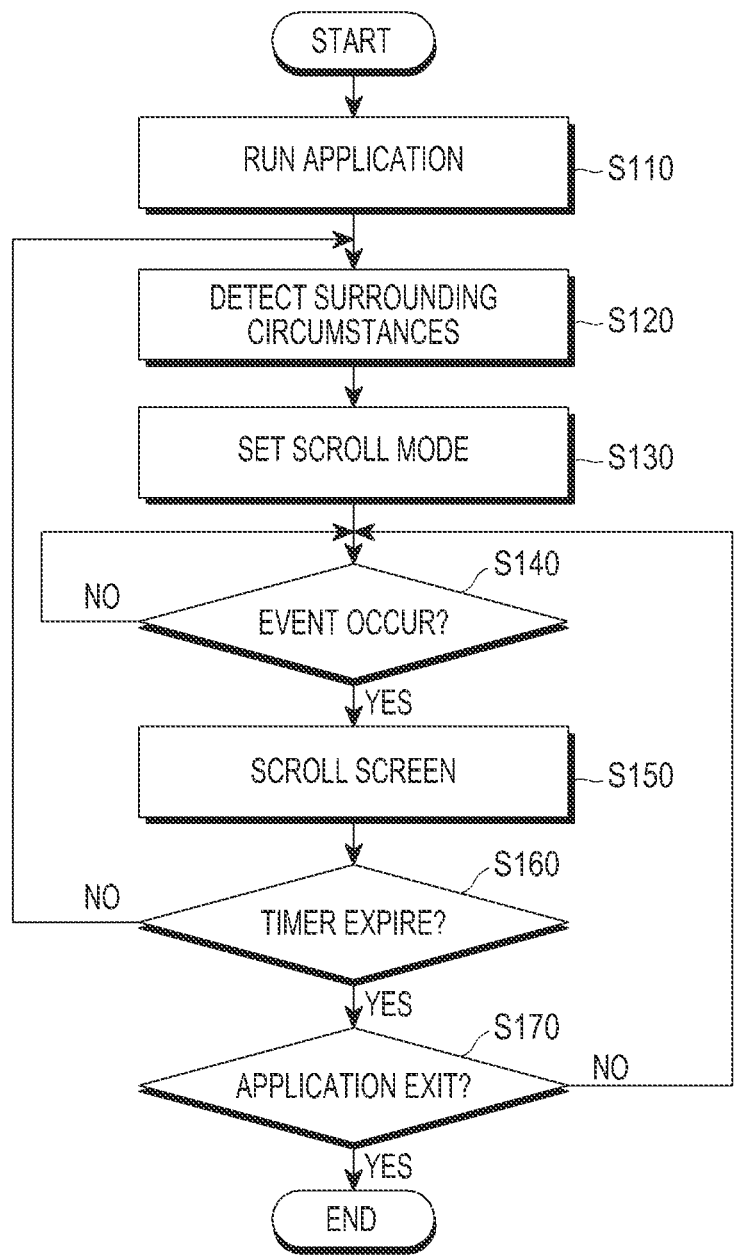
FIG. 4 is a flowchart illustrating a context awareness-based screen scroll method according to an embodiment of the present disclosure.

FIG. 4 is a flowchart illustrating a context awareness-based screen scroll method according to an embodiment of the present disclosure.

The context awareness-based screen scroll method may include operations S110 to S170.

Referring to FIG. 4, the user may execute an application mapped to his/her desired icon in operation S110 or in an application execution operation, by touching the icon among various icons displayed on the touch screen 190.

The controller 110 may receive a user input through the I/O module 160, the touch screen 190, the camera module 150 or the communication module 120. The user may select the button 161, an icon, or a menu item through the I/O module 160 or the touch screen 190, input a voice command through the microphone 162, make a gesture or motion input through the camera module 150, or wirelessly input a specific command through the communication module 120. The command may be an application execution command, and the application may be any application, which may be, for example, a voice recognition application, a schedule management application, a document creation application, a music application, an Internet application, a map application, a camera application, an E-mail application, a photo application, an image editing application, a search application, a file search application, a video application, a game application, a Social Network Service (SNS) application, a phone application, a message application, or the like. The gesture or motion input may refer to, for example, a user's gesture or motion to draw a trajectory of a pattern such as a circle, a triangle, a rectangle, or the like, with the hand or finger(s) towards the camera module 150. Although an application is assumed to be executed in response to a user input in this embodiment, the application may be automatically executed in response to occurrence of events such as reception of a message, reception of a call, occurrence of an alarm, or the like.

In operation S120 or a surrounding circumstance recognition operation, the controller 110 may recognize or detect the user's surrounding circumstances through the camera module 150, the sensor module 170, and/or the I/O module 160.

The surrounding circumstance detection results may be used to set a scroll mode in the future, and in this embodiment, a vision scroll mode and a motion scroll mode may be given as examples of selectable scroll modes. The vision scroll mode may refer to a mode in which the controller 110 scrolls the screen depending on the movement of a subject captured by the camera module 150. The motion scroll mode may refer to a mode in which the controller 110 scrolls the screen depending on the movement of the mobile terminal 100. In addition, a voice scroll mode may be considered as a scroll mode applicable to the present disclosure, and the voice scroll mode may refer to a mode in which the controller 110 scrolls the screen depending on the user's voice detected by the microphone 162.

For example, the controller 110 may detect a physical connection between the mobile terminal 100 and a peripheral device such as a dock through the connector 165. The dock may be used for charging, fixation and PC connection of the mobile terminal 100.

The controller 110 may detect ambient illuminance through the camera module 150 or the sensor module 170.

The controller 110 may detect front illuminance through the first camera 151 or the illuminance sensor 170a, and detect rear illuminance through the second camera 152.

In operation S130 or a scroll mode setting operation, the controller 110 may set a scroll mode based on the surrounding circumstance recognition results.

The controller 110 may determine whether the mobile terminal 100 is fixed. The controller 110 may set a vision scroll mode if the mobile terminal 100 is fixed, and set a motion scroll mode if the mobile terminal 100 is not fixed.

If the mobile terminal 100 is fixed to or mounted on the dock, or is left unattended on the surface of the table, the floor, or the like (i.e., if the mobile terminal 100 is fixed without being carried by the user), then the controller 110 may set the vision scroll mode. The phrase 'being left unattended' may refer to a state in which the mobile terminal 100 is not connected to a peripheral device, nor carried by the user. For example, upon detecting a connection between the mobile terminal 100 and the dock through the connector 165, the controller 110 may set the vision scroll mode, if no movement of the mobile terminal 100 is detected through the sensor module 170 for a threshold time, if a difference between front illuminance and rear illuminance is greater than or equal to a threshold, or in combination thereof.

After detecting ambient illuminance, the controller 110 may set the vision scroll mode if the ambient illuminance is greater than or equal to a threshold, and set the motion scroll mode if the ambient illuminance is less than a threshold. In other words, the controller 110 may set the motion scroll mode if the surroundings of the mobile terminal 100 are dark.

After determining whether the mobile terminal 100 is fixed, the controller 110 may set the vision scroll mode if the mobile terminal 100 is fixed, and detect ambient illuminance if the mobile terminal 100 is not fixed. The controller 110 may set the vision scroll mode if the ambient illuminance is greater than or equal to a threshold, and set the motion scroll mode if the ambient illuminance is less than a threshold.

After detecting ambient illuminance, the controller 110 may set the vision scroll mode if the ambient illuminance is greater than or equal to a threshold, and determine whether the mobile terminal 100 is fixed, if the ambient illuminance is less than a threshold. The controller 110 may set the voice scroll mode if the mobile terminal 100 is fixed, and set the motion scroll mode if the mobile terminal 100 is not fixed.

After simultaneously determining whether the mobile terminal 100 is fixed and whether illuminance conditions of the mobile terminal 100 are satisfied, the controller 110 may set the vision scroll mode if the mobile terminal 100 is fixed and the illuminance conditions are satisfied, set the voice scroll mode if the mobile terminal 100 is fixed and the illuminance conditions are unsatisfied, set the vision scroll mode if the mobile terminal 100 is not fixed and the illuminance conditions are satisfied, and set the motion scroll mode if the mobile terminal 100 is not fixed and the illuminance conditions are unsatisfied.

In operation S140 or an operation of determining whether an event occurs, the controller 110 may determine whether an event set for the scroll mode occurs. An event for the vision scroll mode may occur if movement of a subject such as eyes, face and hands is detected from an image captured by the camera module 150, and an event for the motion scroll mode may occur if the mobile terminal 100 is tilted at a threshold angle or more with respect to an initial position or an initial angular position. An event for the voice scroll mode may occur, if the controller 110 receives a voice command such as 'Right', 'Left', 'Up', 'Down', 'Scroll Up', 'Scroll Down', 'Scroll Right' and 'Scroll Left', through the microphone 162.

The controller 110 may scroll the screen depending on the occurrence of multiple events. For example, on the assumption that a subject is detected from a captured image, the controller 110 may scroll the screen, if movement of the subject is detected, or if movement of the mobile terminal 100 is detected.

In operation S150 or a screen scroll operation, the controller 110 may scroll the screen in a direction corresponding to the event.

In operation S160 or an operation of determining whether a timer expires, the controller 110 may update the scroll mode by recognizing the surrounding circumstances periodically (i.e., every time the timer expires). The timer may be counted or started beginning at the time the scroll mode is set in operation S130, and the timer may be initialized back to an initial value (e.g., 1 minute) after its expiration.

In operation S170 or an operation of determining whether an application is terminated, the controller 110 may determine whether an application is terminated. The controller 110 may end the context awareness-based screen scroll method if the application is terminated, and repeat operation S140 if the application is not terminated.

Figure 5:
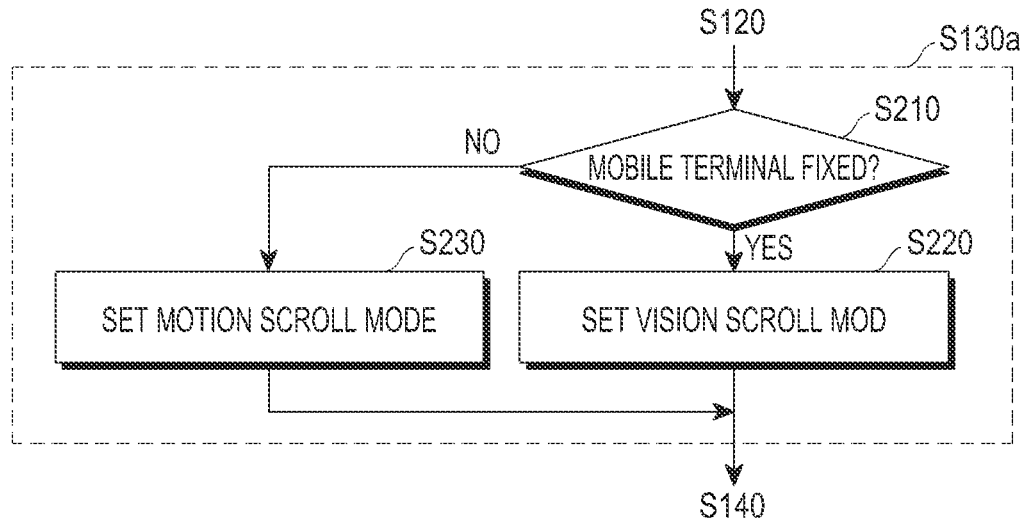
FIG. 5 illustrates a scroll mode setting method according to a first embodiment of the present disclosure.

FIG. 5 illustrates a scroll mode setting method according to a first embodiment of the present disclosure. A scroll mode setting operation according to this embodiment may replace operation S130 in FIG. 4. Hence, the scroll mode setting operation is labelled S130a to indicate an option for implementing a scroll mode setting operation.

Referring to FIG. 5, the controller 110 may determine whether the mobile terminal 100 is fixed in operation S210 or an operation of determining whether the mobile terminal 100 is fixed. In an embodiment, the controller 110 may determine whether the mobile terminal 100 is fixed through the connector 165, the camera module 150, the sensor module 170, or a combination thereof.

In operation S220 or an operation of setting a vision scroll mode, the controller 110 may set the vision scroll mode if the mobile terminal 100 is fixed.

In operation S230 or an operation of setting a motion scroll mode, the controller 110 may set the motion scroll mode if the mobile terminal 100 is not fixed.

Figure 6:
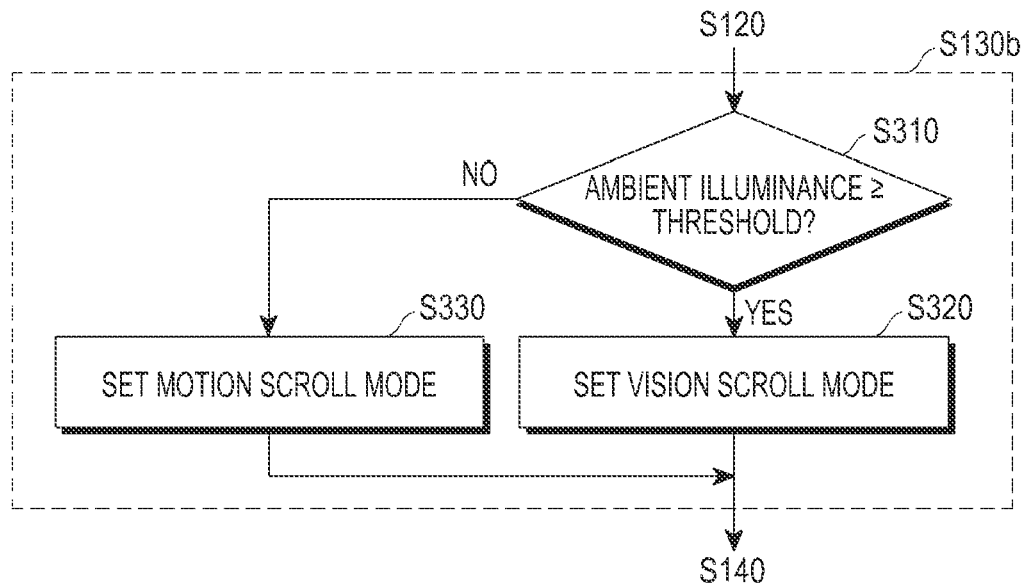
FIG. 6 illustrates a scroll mode setting method according to a second embodiment of the present disclosure.

FIG. 6 illustrates a scroll mode setting method according to a second embodiment of the present disclosure. A scroll mode setting operation according to this embodiment may replace operation S130 in FIG. 4. Hence, the scroll mode setting operation is labelled S130b to indicate another option for implementing a scroll mode setting operation.

Referring to FIG. 6, the controller 110 may compare ambient illuminance in operation S310 or an operation of determining whether illuminance conditions are satisfied. In an embodiment, the controller 110 may compare ambient illuminance detected by the camera module 150 or the sensor module 170 with a threshold. The threshold may be determined based on a subject recognition success rate corresponding to a change in ambient illuminance. For example, ambient illuminance, at which the subject recognition success rate is 70%, may be set as a threshold.

In operation S320 or an operation of setting a vision scroll mode, the controller 110 may set the vision scroll mode if the ambient illuminance is greater than or equal to a threshold.

In operation S330 or an operation of setting a motion scroll mode, the controller 110 may set the motion scroll mode if the ambient illuminance is less than a threshold.

Figure 7:
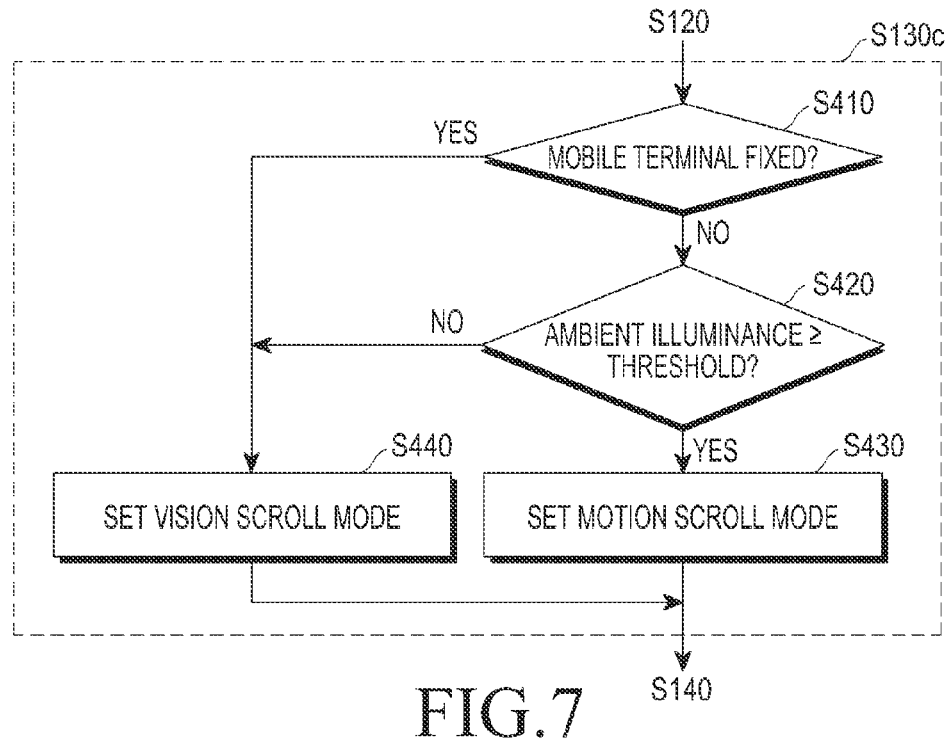
FIG. 7 illustrates a scroll mode setting method according to a third embodiment of the present disclosure.

FIG. 7 illustrates a scroll mode setting method according to a third embodiment of the present disclosure. A scroll mode setting operation according to this embodiment may replace operation S130 in FIG. 4. Hence, the scroll mode setting operation is labelled S130c to indicate another option for implementing a scroll mode setting operation.

Referring to FIG. 7, the controller 110 may determine whether the mobile terminal 100 is fixed in operation S410 or an operation of determining whether the mobile terminal 100 is fixed. In an embodiment, the controller 110 may determine whether the mobile terminal 100 is fixed through the connector 165, the camera module 150, the sensor module 170, or a combination thereof.

In operation S420 or an operation of determining whether illuminance conditions are satisfied, if the mobile terminal 100 is not fixed, the controller 110 may compare ambient illuminance detected by the camera module 150 or the sensor module 170 with a threshold.

In operation S430 or an operation of setting a motion scroll mode, the controller 110 may set the motion scroll mode, if the mobile terminal 100 is not fixed and the ambient illuminance is less than the threshold.

In operation S440 or an operation of setting a vision scroll mode, the controller 110 may set the vision scroll mode, if the mobile terminal 100 is fixed.

Figure 8:
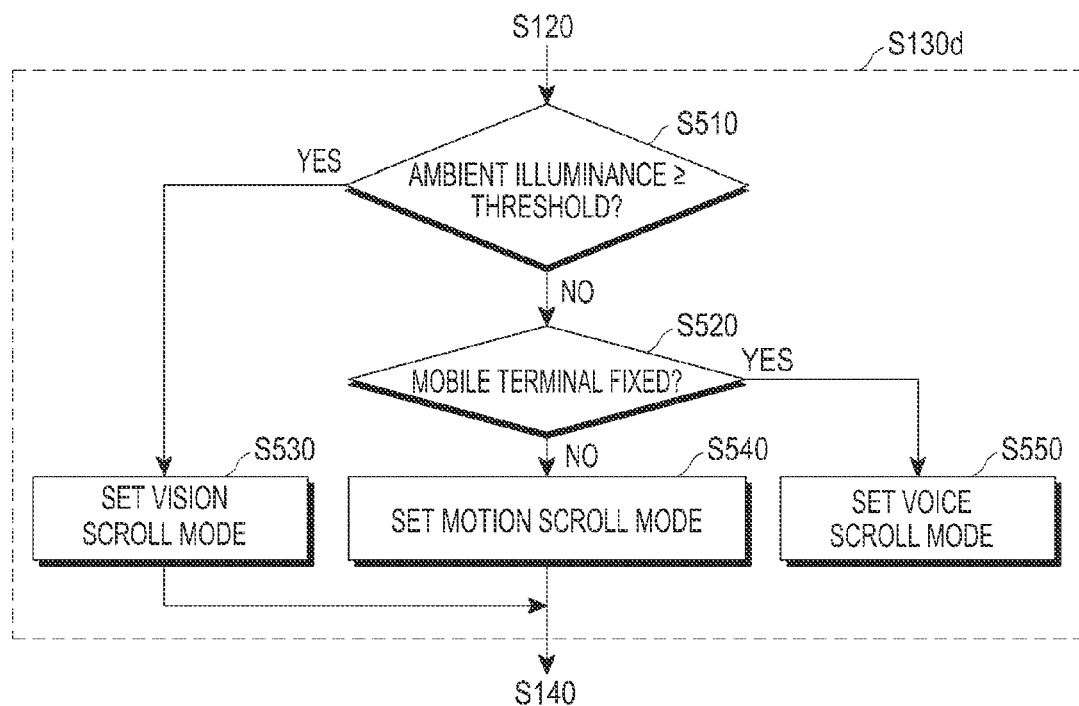
FIG. 8 illustrates a scroll mode setting method according to a fourth embodiment of the present disclosure.

FIG. 8 illustrates a scroll mode setting method according to a fourth embodiment of the present disclosure. A scroll mode setting operation according to this embodiment may replace operation S130 in FIG. 4. Hence, the scroll mode setting operation is labelled S130d to indicate another option for implementing a scroll mode setting operation.

Referring to FIG. 8, the controller 110 may compare ambient illuminance in operation S510 or an operation of determining if illuminance conditions are satisfied. In an embodiment, the controller 110 may compare ambient illuminance detected by the camera module 150 or the sensor module 170 with a threshold.

In operation S520 or an operation of determining whether the mobile terminal 100 is fixed, if the ambient illuminance is less than the threshold, the controller 110 may determine whether the mobile terminal 100 is fixed, through the connector 165, the camera module 150, the sensor module 170, or a combination thereof.

In operation S530 or an operation of setting a vision scroll mode, the controller 110 may set the vision scroll mode if the ambient illuminance is greater than or equal to the threshold.

In operation S540 or an operation of setting a motion scroll mode, the controller 110 may set the motion scroll mode if the ambient illuminance is less than the threshold and the mobile terminal 100 is not fixed.

In operation S550 or an operation of setting a voice scroll mode, the controller 110 may set the voice scroll mode if the ambient illuminance is less than the threshold and the mobile terminal 100 is fixed.

Figure 9:
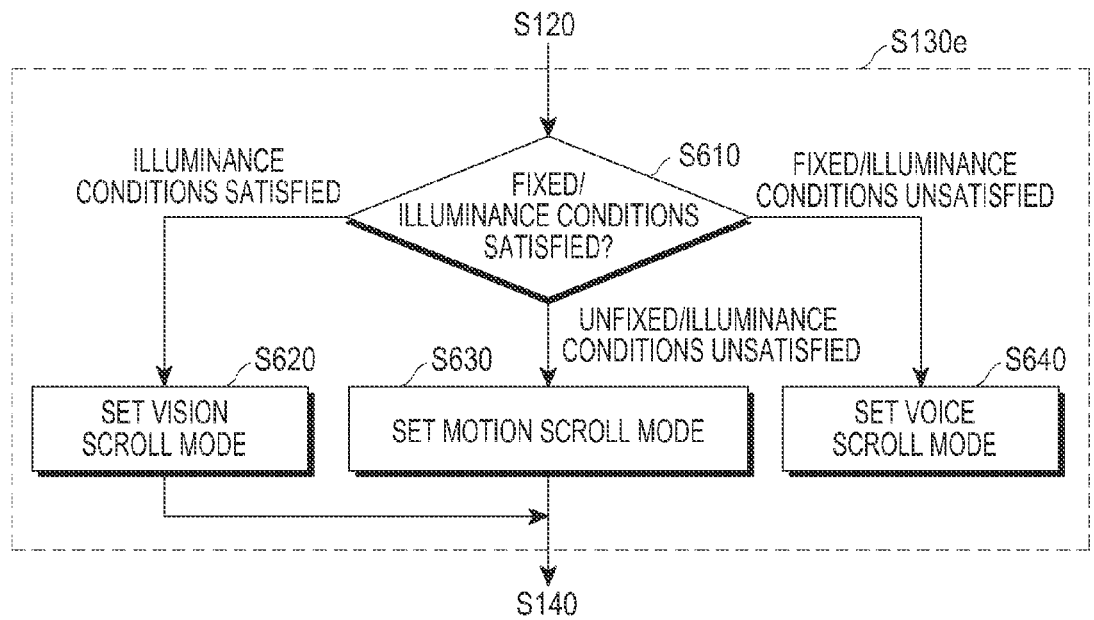
FIG. 9 illustrates a scroll mode setting method according to a fifth embodiment of the present disclosure.

FIG. 9 illustrates a scroll mode setting method according to a fifth embodiment of the present disclosure. A scroll mode setting operation according to this embodiment may replace operation S130 in FIG. 4. Hence, the scroll mode setting operation is labelled S130e to indicate another option for implementing a scroll mode setting operation.

Referring to FIG. 9, the controller 110 may determine whether the mobile terminal 100 is fixed in operation S610 or an operation of determining whether the mobile terminal 100 is fixed and illuminance conditions are satisfied. In an embodiment, the controller 110 may determine whether the mobile terminal 100 is fixed through the connector 165, the camera module 150, the sensor module 170 or a combination thereof, and compare ambient illuminance detected by the camera module 150 or the sensor module 170 with a threshold.

In operation S620 or an operation of setting a vision scroll mode, the controller 110 may set the vision scroll mode, if the ambient illuminance is greater than or equal to a threshold regardless of whether the mobile terminal 100 is fixed.

In operation S630 or an operation of setting a motion scroll mode, the controller 110 may set the motion scroll mode, if the mobile terminal 100 is not fixed and the ambient illuminance is less than a threshold.

In operation S640 or an operation of setting a voice scroll mode, the controller 110 may set the voice scroll mode, if the mobile terminal 100 is fixed and the ambient illuminance is less than a threshold.

Figure 10:
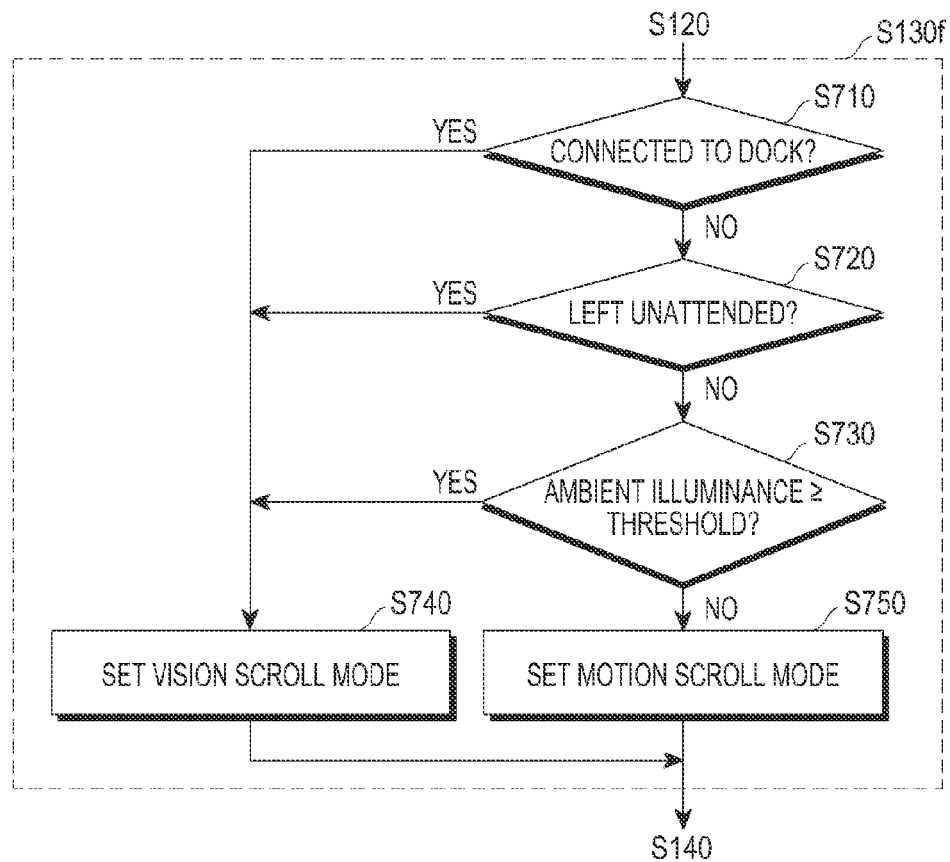
FIG. 10 illustrates a scroll mode setting method according to a sixth embodiment of the present disclosure.

FIG. 10 illustrates a scroll mode setting method according to a sixth embodiment of the present disclosure. A scroll mode setting operation according to this embodiment may replace operation S130 in FIG. 4. Hence, the scroll mode setting operation is labelled S130f to indicate another option for implementing a scroll mode setting operation.

Referring to FIG. 10, the controller 110 may determine whether the mobile terminal 100 is connected to the dock through the connector 165 in operation S710 or an operation of determining whether the mobile terminal 100 is connected to a dock.

In operation S720 or an operation of determining whether the mobile terminal 100 is left unattended, in a case where the mobile terminal 100 is not connected to the dock, the controller 110 may determine that the mobile terminal 100 is left unattended on the surface of the table, the floor, or the like, if no movement of the mobile terminal 100 is detected through the sensor module 170 for a threshold time, or if a difference between front illuminance and rear illuminance is greater than or equal to a threshold.

In operation S730 or an operation of determining whether illuminance conditions are satisfied, if the mobile terminal 100 is not connected to the dock and not left unattended, the controller 110 may compare ambient illuminance detected by the camera module 150 or the sensor module 170 with a threshold.

In operation S740 or an operation of setting a vision scroll mode, the controller 110 may set the vision scroll mode if the mobile terminal 100 is connected to the dock, if the mobile terminal 100 is left unattended, or if the illuminance conditions are satisfied.

In operation S750 or an operation of setting a motion scroll mode, the controller 110 may set the motion scroll mode if the mobile terminal 100 is not connected to the dock and is not left unattended and if the illuminance conditions are unsatisfied.

The screen scroll in an embodiment of the present disclosure may be classified into scroll-up in which the upper part of the current screen moves down, scroll-down in which the lower part of the current screen moves up, scroll-left in which the left part of the current screen moves right, and scroll-right in which the right part of the current screen moves left.

This screen scroll may be applied to an object, a part of which is displayed on one screen, such as an image, a web page, a menu and a list, or to continuous objects such as multiple pages constituting a home screen, and multiple images in an image gallery.

FIGS. 11A to 11C, 12A to 12C, and 13A to 13C illustrate examples of screen scroll according to embodiments of the present invention.

Figure 11:
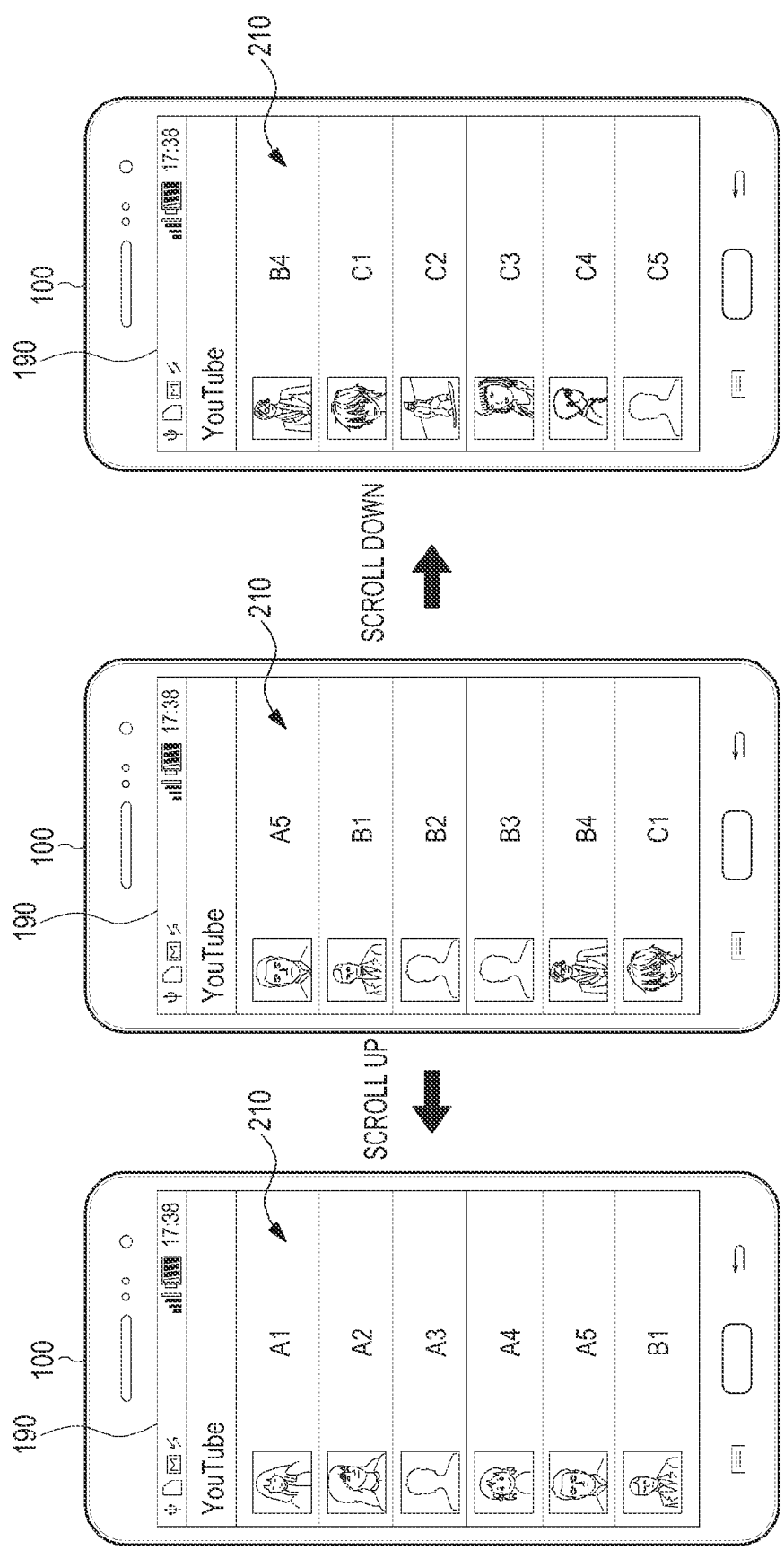
FIGS. 11A, 11B, 11C, 12A, 12B, 12C, 13A, 13B, and 13C illustrate examples of screen scroll according to embodiments of the present disclosure.

FIGS. 11A to 11C illustrate an example in which a contact list 210 having multiple contacts is displayed on the touch screen 190 when a user runs a phone book application.

Referring to FIG. 11B, a part (e.g., A5, B1~B4, and C1) of the contact list 210 such as a phone book is displayed on the touch screen 190.

Referring to FIG. 11A, if the user scrolls-up, the upper part (e.g., A5 on the top of the screen) of the contact list 210 may move to the lower part of the touch screen 190 so the hidden contacts A1~A4 may be displayed on the touch screen 190.

Referring to FIG. 11C, if the user scrolls-down, the lower part (e.g., C1 on the bottom of the screen) of the contact list 210 may move to the upper part of touch screen 190, so the hidden contacts C2~C5 may be displayed on the touch screen 190.

Figure 12:
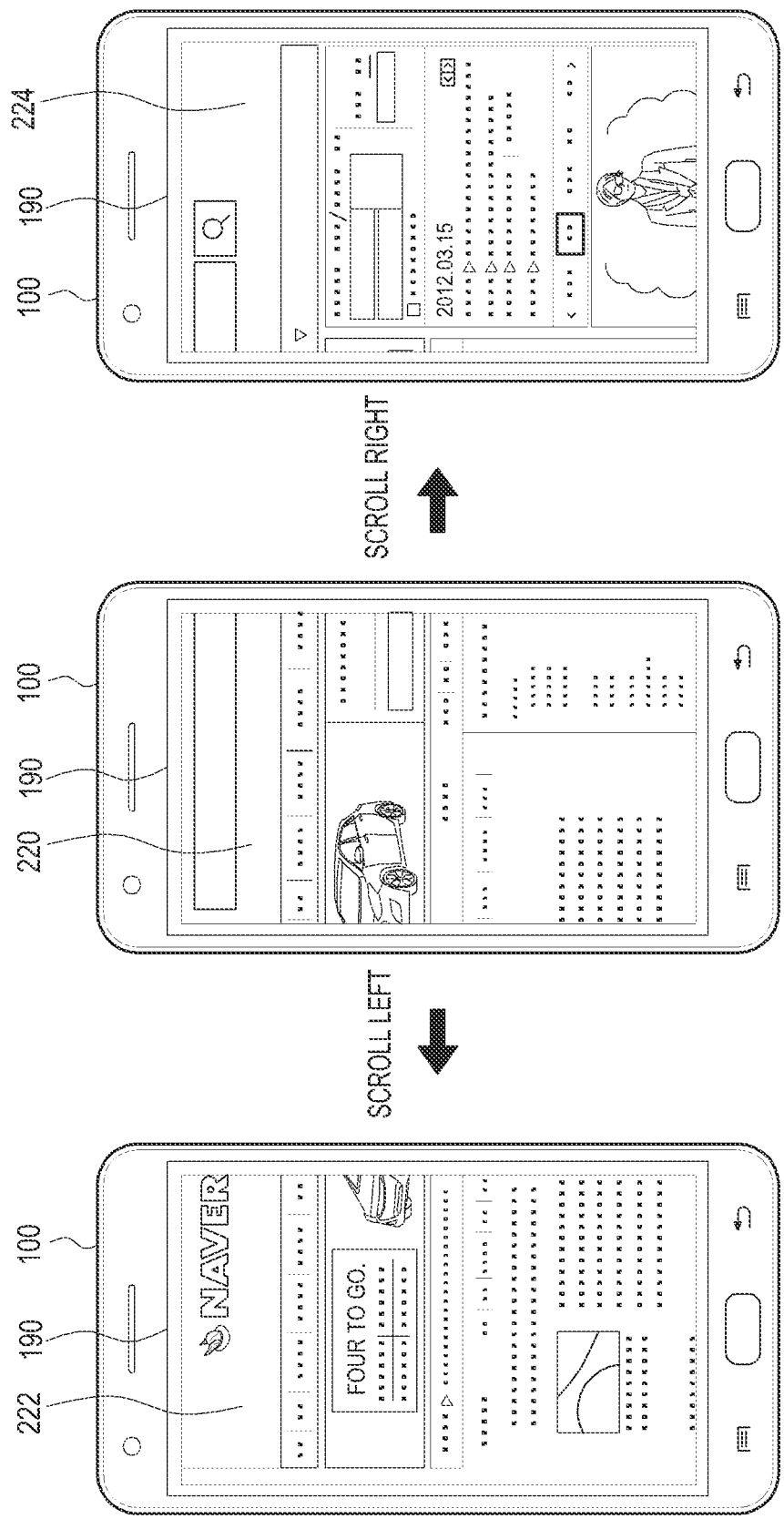

FIGS. 12A to 12C illustrate an example in which a web page is displayed on the touch screen 190 when a user runs an Internet application.

Referring to FIG. 12B, the middle part 220 of the web page is displayed on the touch screen 190.

Referring to FIG. 12A, if the user scrolls-left, the left part of the screen may move to the right part of the screen, so the hidden left part 222 of the web page may be displayed on the touch screen 190.

Referring to FIG. 12C, if the user scrolls-right, the right part of the screen may move to the left part of the screen, so the hidden right part 224 of the web page may be displayed on the touch screen 190.

Figure 13:
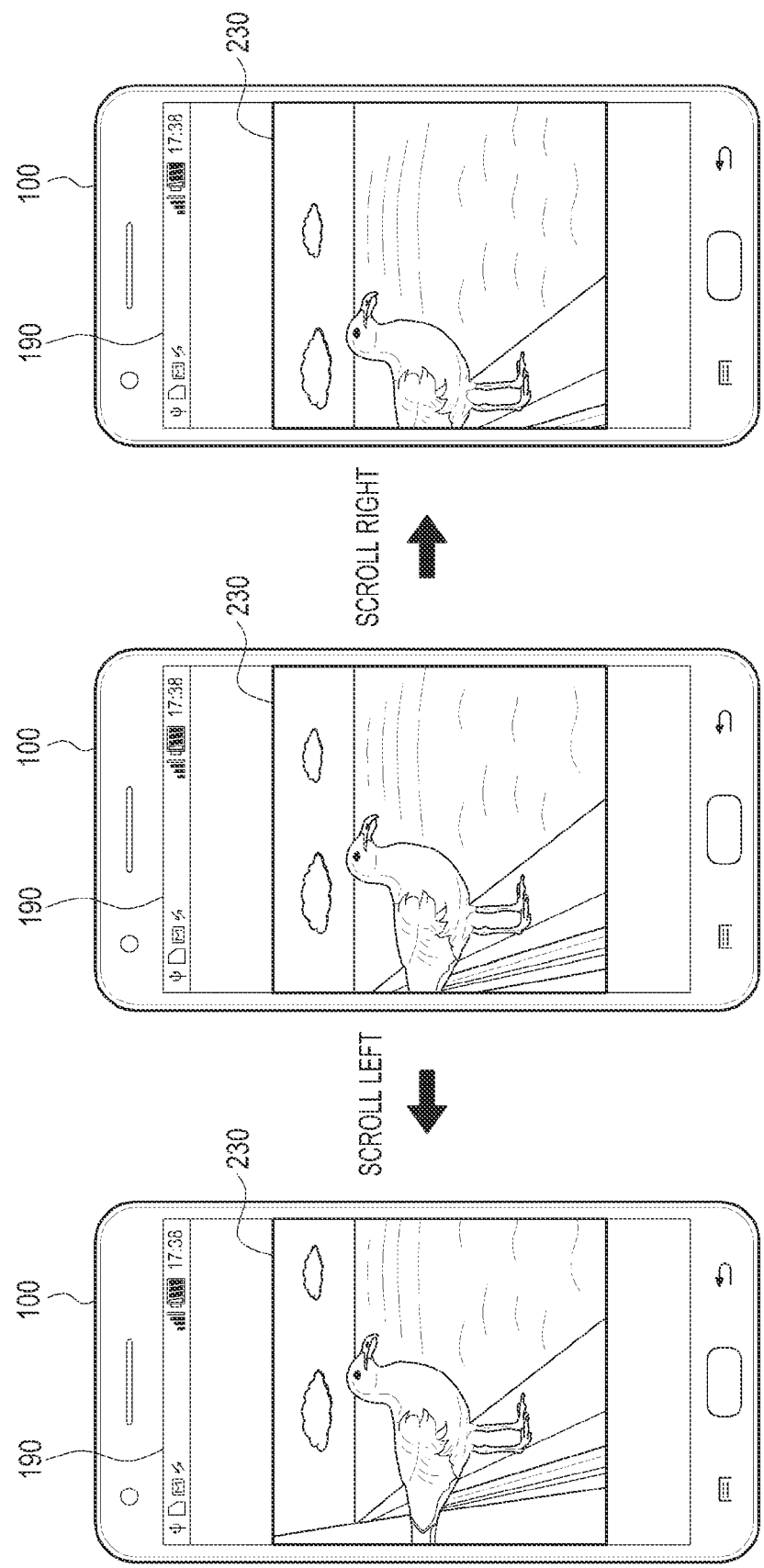

FIGS. 13A to 13C illustrate an example in which a photo of a bird is displayed on the touch screen 190 when a user runs a photo application and selects the photo of a bird.

Referring to FIG. 13B, the middle part of a photo 230 is displayed on the touch screen 190.

Referring to FIG. 13A, if the user scrolls-left, the left part of the screen may move to the right part of the screen, so the hidden left part of the photo 230 may be displayed on the touch screen 190.

Referring to FIG. 13C, if the user scrolls-right, the right part of the screen may move to the left part of the screen, so the hidden right part of the photo 230 may be displayed on the touch screen 190.

Figure 14:
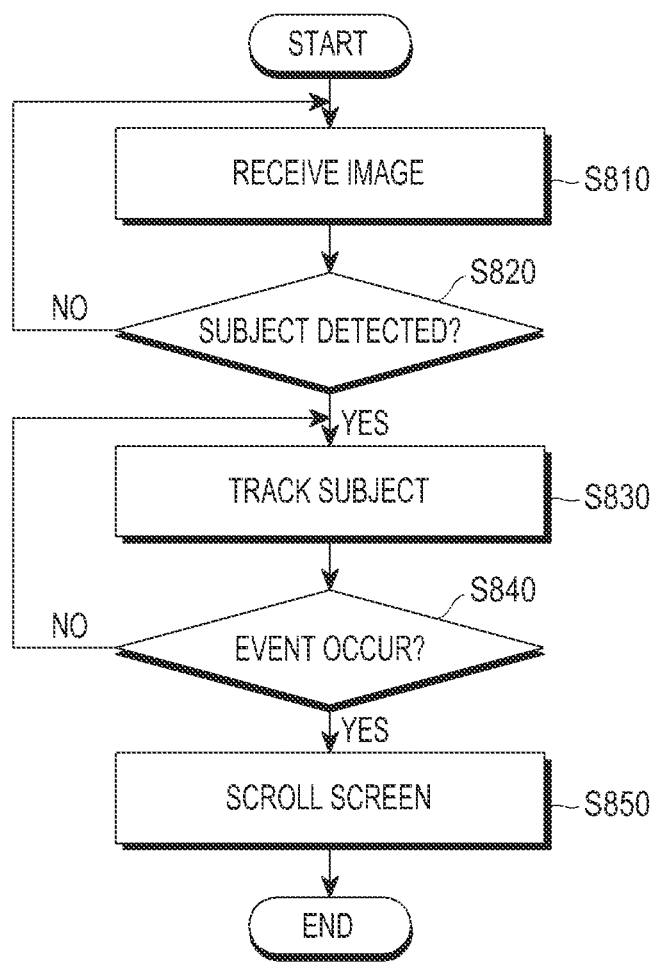
FIG. 14 is a flowchart illustrating a screen scroll method in a vision scroll mode according to the first embodiment of the present disclosure.
Figure 15A:
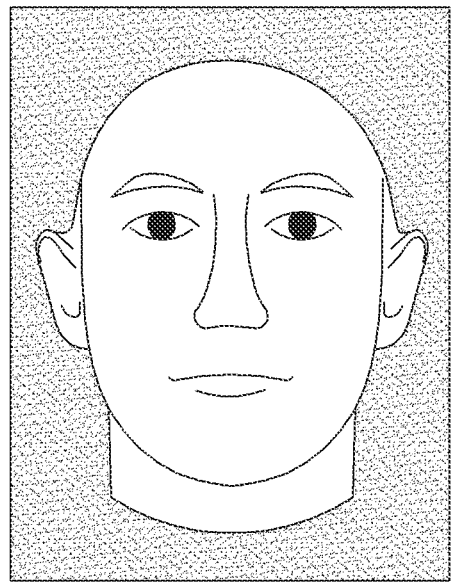
FIGS. 15A and 15B illustrate a screen scroll method in a vision scroll mode according to the first embodiment of the present disclosure.
Figure 15B:
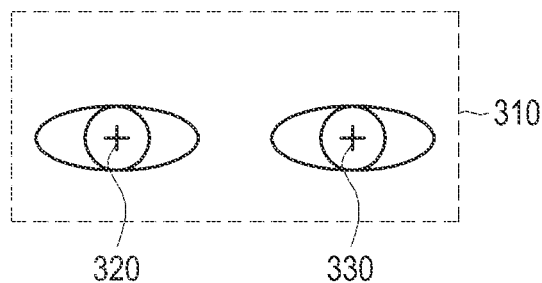

FIG. 14 is a flowchart illustrating a screen scroll method in a vision scroll mode according to the first embodiment of the present disclosure, and FIGS. 15A and 15B illustrate a screen scroll method in a vision scroll mode according to the first embodiment of the present disclosure.

The screen scroll method in the vision scroll mode may include operations S810 to S850.

Referring to FIG. 14, the controller 110 may receive a real-time image from the camera module 150 in operation S810 or an image receiving operation. The screen scroll method may be applied to real-time images or real-time image frames, which are sequentially received.

In operation S820 or an operation of determining whether a registered subject is detected, the controller 110 may determine whether a subject registered in advance in the mobile terminal 100 is detected from the image. The registration of a subject may be made by storing information for detecting the subject in the storage unit 175. The registered subject may be a face, a hand, eyes, a nose, or a combination thereof. In order to prevent unintended screen scroll, screen scroll may take place while at least part of the user's body is captured by the camera module 150. The information for detecting the subject may include subject image information, information about feature points (also called a feature image, a feature pattern, or the like) of a subject image, face learning data, or the like. These feature points may be edges, corners, image patterns, outlines, or the like.

For example, the controller 110 may determine whether a face is included in the image. The face detection may be performed using the normal face detection method, for which face detection technology is used, which is based on the contour of the face, the color and/or texture of the face skin, templates, or the like. For example, the controller 110 may detect an image region (i.e., a detected subject) matching the registered subject, by performing a process of matching feature points of the registered subject image with the feature points detected from the input image. The controller 110 may perform face learning using multiple face images, and detect a face from the input image based on the accumulated face learning data.

FIGS. 15A and 15B illustrate a screen scroll method in a vision scroll mode according to the first embodiment of the present disclosure.

Referring to FIG. 15A, a scroll method using a detected face is illustrated. In an alternative, the controller 110 may determine whether a hand, eyes, or a nose is/are included in the image.

In the example of FIG. 15A, the controller 110 may detect eyes and/or a nose. The detection of eyes and/or a nose may be accomplished using feature point matching, face learning data, or the like. The controller 110 may detect position information of the eyes and/or nose.

Referring to FIG. 15B a scroll method using detected eyes 310 is illustrated.

The controller 110 may detect coordinates 320 and 330 of the left and right eyes, respectively. The coordinates of eyes may be X and Y-axis coordinates for the centers of pupils. The coordinates of a nose may be X and Y-axis coordinates for the tip of the nose.

Referring again to FIG. 14, the controller 110 may perform operation S830 upon detecting the registered subject, and repeat operations S810 and S820 if the registered subject is not detected.

In operation S830 or an operation of tracking a subject, the controller 110 may track movement (i.e., a change in position) of the subject detected from continuously captured images. For example, the controller 110 may track a change in a two-dimensional position of the subject detected from continuously captured images, or may track a pose (i.e., three-dimensional position and orientation) of the subject.

For example, the controller 110 may track an accumulated change in position of eyes in the continuously captured images.

In operation S840 or an operation of determining whether an event occurs, the controller 110 may determine whether an event set for the vision scroll mode occurs. To this end, the controller 110 may determine whether an accumulated change in position of the tracked subject exceeds a threshold. Alternatively, the controller 110 may determine whether a moving speed of the tracked subject exceeds a threshold.

For example, after determining a moving direction of the subject, the controller 110 may determine that any one of 'scroll up', 'scroll down', 'scroll right' and 'scroll left' events has occurred, if an accumulated change in position in the moving direction exceeds a threshold for the moving direction.

Figure 16:
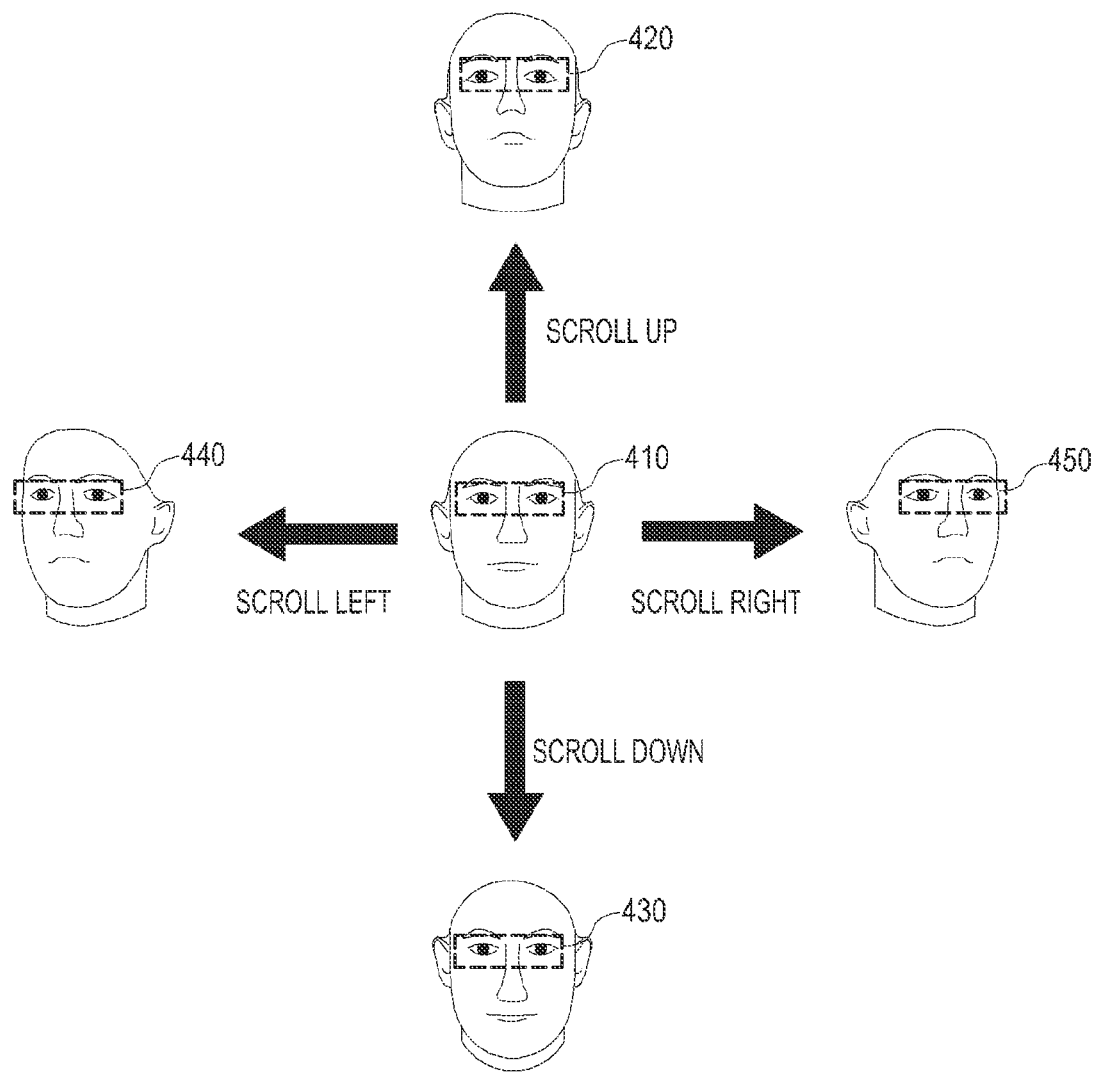
FIG. 16 illustrates a change in position of eyes depending on the type of an event according to an embodiment of the present disclosure.

FIG. 16 illustrates a change in position of eyes depending on the type of an event according to an embodiment of the present disclosure.

Referring to FIG. 16, reference numeral 410 represents initial eye positions, reference numeral 420 represents changed eye positions corresponding to a scroll-up event, reference numeral 430 represents changed eye positions corresponding to a scroll-down event, reference numeral 440 represents changed eye positions corresponding to a scroll-left event, and reference numeral 450 represents changed eye positions corresponding to a scroll-right event.

Referring again to FIG. 14, if an event occurs in operation S840, the controller 110 may perform operation S850. Otherwise, if no event occurs, the controller 110 may repeat operation S830.

In operation S850 or a screen scroll operation, the controller 110 may scroll the screen in a direction corresponding to the event.

Figure 17:
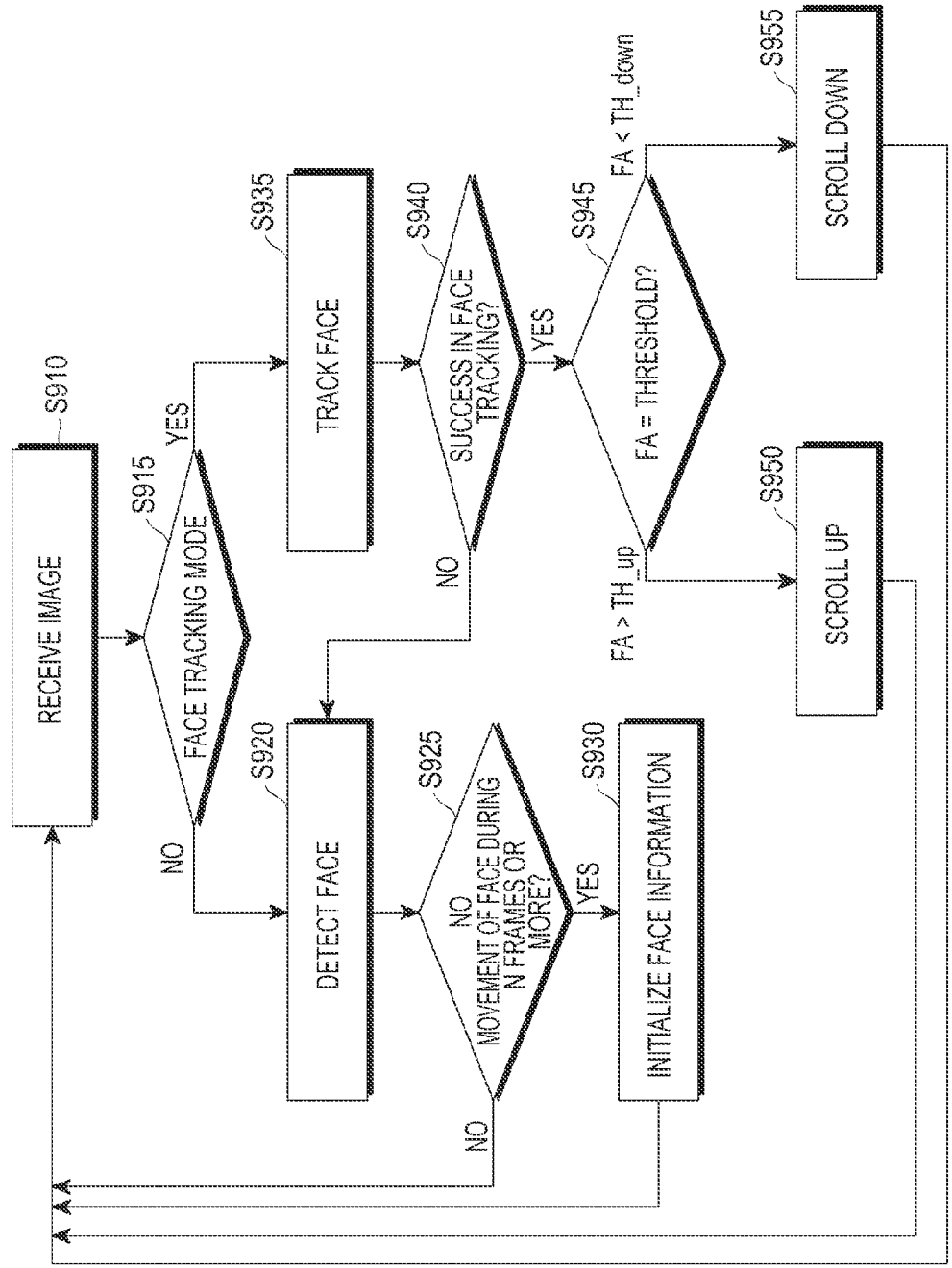
FIG. 17 is a flowchart illustrating a screen scroll method in a vision scroll mode according to the second embodiment of the present disclosure.

FIG. 17 is a flowchart illustrating a screen scroll method in a vision scroll mode according to the second embodiment of the present disclosure. In the second embodiment, a registered subject will be assumed to be a face.

The screen scroll method in the vision scroll mode may include operations S910 to S955.

Referring to FIG. 17, the controller 110 may receive a real-time image from the camera module 150 in operation S910 or an image receiving operation. The screen scroll method may be applied to real-time images or real-time image frames, which are sequentially received or read.

In operation S915 or an operation of determining whether a face tracking mode is set, the controller 110 may determine that the face tracking mode is set, if a face is detected from a previous image frame. The controller 110 may perform operation S920 if the face tracking mode is not set, and perform operation S935 if the face tracking mode is set. In other words, in operation S915, the controller 110 may determine whether face detection for face tracking has been carried out in advance.

In operation S920 or a face detection operation, the controller 110 may detect a face from the current image frame.

In operation S925 or an operation of determining whether there is screen trembling, the controller 110 may determine whether face trembling takes place in N image frames following the image frame where the face was detected. In other words, in operation S925, the controller 110 may determine whether the screen is in a stabilized state, for future face tracking. The controller 110 may repeat operation S910 if there is screen trembling, and perform operation S930 if there is no screen trembling.

In operation S930 or an initialization operation, the controller 110 may perform face tracking on image frames following the image frame where the face was detected. The controller 110 may store, in the storage unit 175, the image frame where the face was detected, and information (e.g., feature points for a target to be tracked, and positions of the feature points) about the face detected from the image frame.

In operation S935 or a face tracking operation, the controller 110 may track movement (e.g., a change in position) of the face in captured image frames.

In operation S940 or an operation of determining whether face tracking is successful, the controller 110 may determine whether face tracking is successful. A failure in face tracking may refer to a failure in detecting a face from an image frame.

The controller 110 may perform operation S945 upon succeeding in face tracking, and perform operation S920 upon failure in face tracking.

In operation S945 or an operation of determining whether an event occurs, the controller 110 may compare an accumulated change FA in position of the face with a threshold. In this embodiment, among others, a first threshold TH_up for a scroll-up event and a second threshold TH_down for a scroll-down event will be considered, by way of example. FA may represent, as a value of '+', upward movement of the face from a reference position of the face, and represent downward movement of the face as a value of '−'. Therefore, TH_up may have a value of '+', and TH_down may have a value of '−'.

The controller 110 may perform operation S950 for FA>TH_up, and perform operation S955 for FA<TH_down.

The controller 110 may scroll up the screen in operation S950, and scroll down the screen in operation S955.

Figure 18:
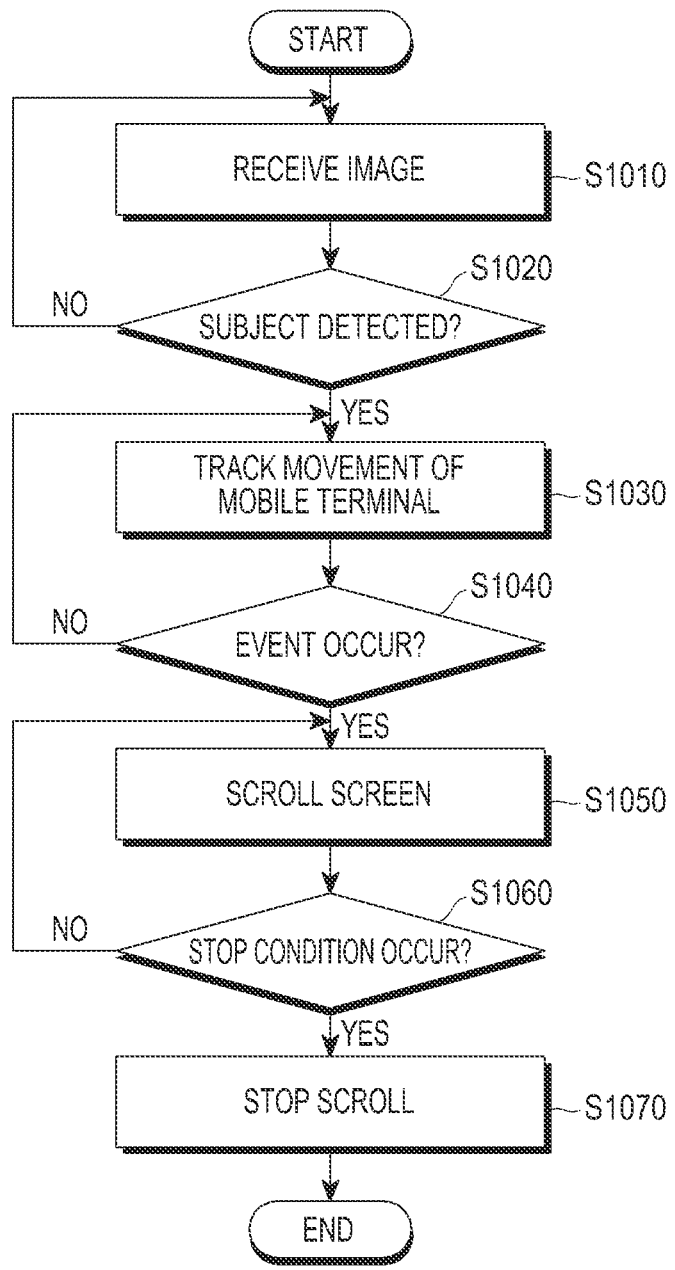
FIG. 18 is a flowchart illustrating a screen scroll method in a motion scroll mode according to the first embodiment of the present disclosure.

FIG. 18 is a flowchart illustrating a screen scroll method in a motion scroll mode according to the first embodiment of the present disclosure.

The screen scroll method in the motion scroll mode may include operations S1010 to S1070.

Referring to FIG. 18, the controller 110 may receive a real-time image from the camera module 150 in operation S1010 or an image receiving operation. The screen scroll method may be applied to real-time images or real-time image frames, which are sequentially received or read.

In operation S1020 or an operation of determining whether a registered subject is detected, the controller 110 may determine whether a subject registered in advance in the mobile terminal 100 is detected from the image. The registered subject may be a face, a hand, eyes, a nose, or a combination thereof.

The controller 110 may perform operation S1030 upon detecting the registered subject, and repeat operations S1010 and 1020 upon failure to detect the registered subject.

In operation S1030 or an operation of tracking movement of the mobile terminal 100, the controller 110 may detect changes in position, tilt and pose of the mobile terminal 100.

For example, the controller 110 may track at least one of forward tilt, backward tilt, leftward tilt, and rightward tilt on the basis of the pose of the mobile terminal 100 in the image frame where the face is detected.

In operation S1040 or an operation of determining whether an event occurs, the controller 110 may determine whether an event set for the motion scroll mode occurs. The controller 110 may determine whether an accumulated change in position or angle of the tracked mobile terminal 100 exceeds a threshold. Alternatively, the controller 110 may determine whether a moving or tilt speed of the tracked mobile terminal 100 exceeds a threshold.

For example, after determining a tilt direction of the mobile terminal 100, the controller 110 may determine that any one of 'scroll up', 'scroll down', 'scroll right' and 'scroll left' events has occurred, if an accumulated change in angle in the tilt direction exceeds a threshold for the tilt direction.

Figure 19:
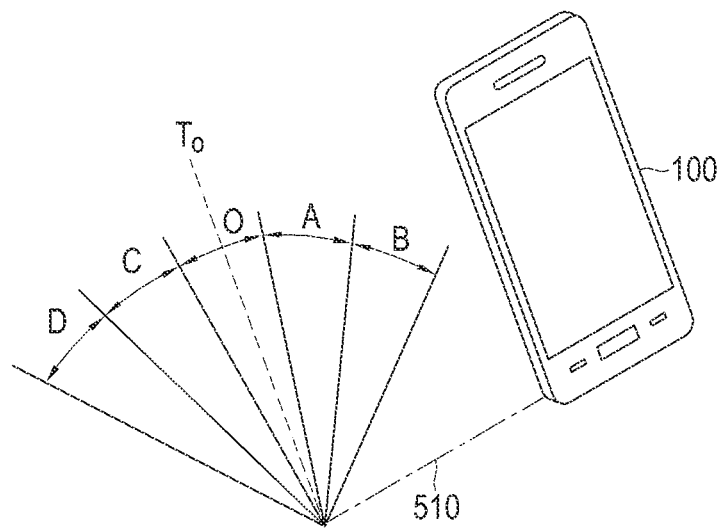
FIGS. 19 and 20 illustrate forward and backward tilts of a mobile terminal according to an embodiment of the present disclosure.
Figure 20:
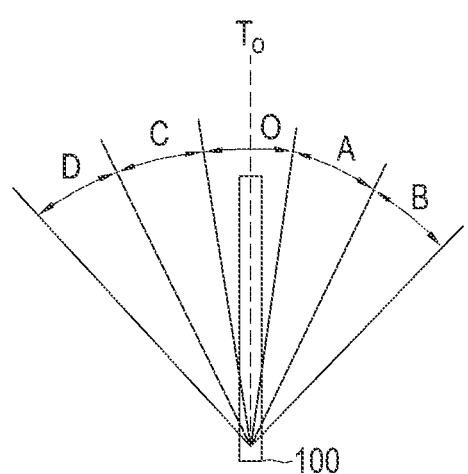

FIGS. 19 and 20 illustrate forward and backward tilts of a mobile terminal according to an embodiment of the present disclosure.

Referring to FIGS. 19 and 20, the controller 110 may set a specific range of forward and backward angles as a stop range O on the basis of an initial position To of the mobile terminal 100 with respect to a point 510 corresponding to a bottom of the mobile terminal 100. In an embodiment, the controller 110 may set a range of an angle, at which the mobile terminal 100 is further tilted forward exceeding the stop range O, as a range A, and set a range of an angle, at which the mobile terminal 100 is further tilted forward exceeding the range A, as a range B.

In addition, the controller 110 may set a range of an angle, at which the mobile terminal 100 is further tilted backward exceeding the stop range O, as a range C, and set a range of an angle, at which the mobile terminal 100 is further tilted backward exceeding the range C, as a range D.

For example, the controller 110 may perform no scroll in the stop range O, perform scroll up at a speed Va in the range A, perform scroll up at a speed Vb (>Va) in the range B, perform scroll down at a speed Vc in the range C, and perform scroll down at a speed Vd (>Vc) in the range D.

As illustrated in FIG. 20, which is a side view of the mobile terminal 100, the controller 110 may determine the scroll speed depending on the tilt speed of the mobile terminal 100. For example, the controller 110 may increase the scroll speed in proportion to the tilt speed of the mobile terminal 100. More specifically, the controller 110 may divide the tilt speed of the mobile terminal 100 into a plurality of speed ranges, and assign a unique scroll speed to each speed range, to discontinuously increase the scroll speed in proportion to the tilt speed of the mobile terminal 100. For example, the controller 110 may perform no scroll in the stop range O, perform scroll up at a speed being proportional to the tilt speed of the mobile terminal 100 in the ranges A and B, and perform scroll down at a speed being proportional to the tilt speed of the mobile terminal 100 in the ranges C and D.

Figure 21:
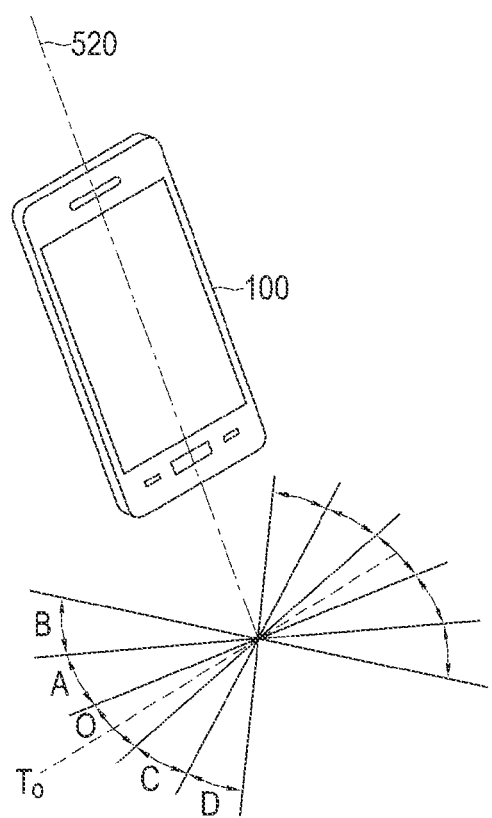
FIGS. 21 and 22 illustrate leftward and rightward tilts of a mobile terminal according to an embodiment of the present disclosure.
Figure 22:
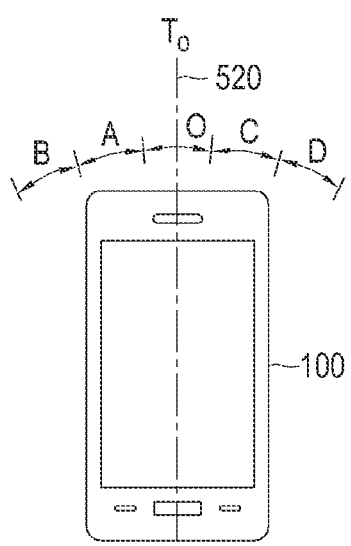

FIGS. 21 and 22 illustrate leftward and rightward tilts of a mobile terminal according to an embodiment of the present disclosure.

Referring to FIGS. 21 and 22, the sideward tilt of the mobile terminal 100 may be classified into a case where the mobile terminal 100 rotates about its longitudinal central axis 520 clockwise or counterclockwise without movement of the central axis, and a case where the mobile terminal 100 is tilted leftward or rightward with respect to its longitudinal central axis together with movement of the central axis.

FIG. 21 illustrates a case where the mobile terminal 100 rotates about its longitudinal central axis clockwise or counterclockwise without movement of the central axis.

As illustrated in FIG. 21, the controller 110 may set a specific range of clockwise and counterclockwise angles as a stop range O on the basis of an initial position To of the mobile terminal 100, set a range of an angle, at which the mobile terminal 100 further rotates clockwise exceeding the stop range O, as a range A, and set a range of an angle, at which the mobile terminal 100 further rotates clockwise exceeding the range A, as a range B.

In addition, the controller 110 may set a range of an angle, at which the mobile terminal 100 further rotates counterclockwise exceeding the stop range O, as a range C, and set a range of an angle, at which the mobile terminal 100 further rotates counterclockwise exceeding the range C, as a range D.

For example, the controller 110 may perform no scroll in the stop range O, perform scroll left at a speed Va in the range A, perform scroll left at a speed Vb (>Va) in the range B, perform scroll right at a speed Vc in the range C, and perform scroll right at a speed Vd (>Vc) in the range D.

As described above, the controller 110 may determine the scroll speed depending on the rotation speed of the mobile terminal 100.

FIG. 22 illustrates a case where the mobile terminal 100 is tilted leftward or rightward with respect to its longitudinal central axis together with movement of the central axis.

As illustrated in FIG. 22, the controller 110 may set a specific range of leftward and rightward angles as a stop range O on the basis of an initial position To of the mobile terminal 100, set a range of an angle, at which the mobile terminal 100 is further tilted leftward exceeding the stop range O, as a range A, and set a range of an angle, at which the mobile terminal 100 is further tilted leftward exceeding the range A, as a range B.

In addition, the controller 110 may set a range of an angle, at which the mobile terminal 100 is further tilted rightward exceeding the stop range O, as a range C, and set a range of an angle, at which the mobile terminal 100 is further tilted rightward exceeding the range C, as a range D.

For example, the controller 110 may perform no scroll in the stop range O, perform scroll left at a speed Va in the range A, perform scroll left at a speed Vb (>Va) in the range B, perform scroll right at a speed Vc in the range C, and perform scroll right at a speed Vd (>Vc) in the range D.

As described above, the controller 110 may determine the scroll speed depending on the tilt speed of the mobile terminal 100.

Referring again to FIG. 18, in operation S1050 or a screen scroll operation, the controller 110 may scroll the screen in a direction corresponding to the event.

In operation S1060 or an operation of determining whether a stop condition occurs, in a case where (i) an end (e.g., top, bottom, left end, or right end) of the full screen, a part of which is displayed on the touch screen 190, is displayed, (ii) the mobile terminal 100 moves or is tilted in a direction toward an initial position or an initial angular position, (iii) the mobile terminal 100 is tilted in the opposite direction to the tilt direction determined during occurrence of an event, or (iv) the registered subject is not detected from the current image, the controller 110 may stop the screen scroll. For stopping the screen scroll, the controller 110 may determine whether the above stop condition occurs. The controller 110 may perform operation S1070 if the stop condition occurs, and continue the screen scroll if the stop condition does not occur.

In operation S1070 or a scroll stop operation, the controller 110 may stop the screen scroll.

Figure 23:
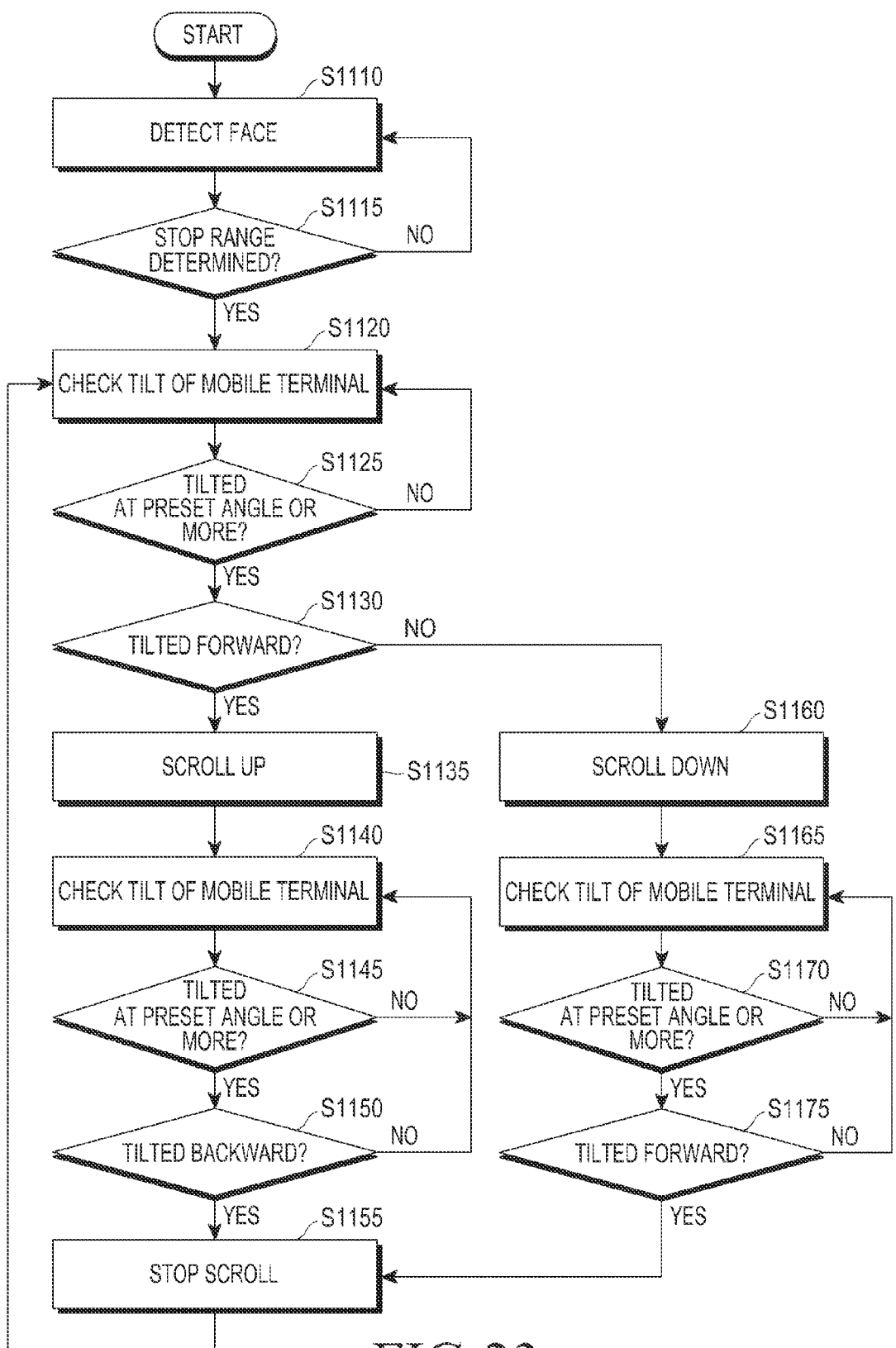
FIG. 23 is a flowchart illustrating a screen scroll method in a motion scroll mode according to the second embodiment of the present disclosure.

FIG. 23 is a flowchart illustrating a screen scroll method in a motion scroll mode according to the second embodiment of the present disclosure. In the second embodiment, among others, scroll up and scroll down will be considered, by way of example.

Referring to FIG. 23, the controller 110 may detect a face from a real-time image received from the camera module 150 in operation S1110 or a face detection operation. The controller 110 may not perform the succeeding operations upon its failure to detect a face from a real-time image.

In operation S1115 or an operation of determining a stop range, the controller 110 may set a specific range of forward and backward angles as a stop range on the basis of the position of the mobile terminal 100, which was determined at the time the face was detected.

In operation S1120 or an operation of determining a tilt of a terminal, the controller 110 may determine a forward or backward tilt of the mobile terminal 100 using the sensor module 170.

In operation S1125 or an operation of determining a tilt angle of a terminal, the controller 110 may determine whether the mobile terminal 100 is tilted at a threshold angle or more. The threshold angle may correspond to the boundary between the stop range O and the range A or C illustrated in FIG. 20. The controller 110 may perform operation S1130 if the mobile terminal 100 is tilted at a threshold angle or more, and repeat operation S1120 if the mobile terminal 100 is not tilted at a threshold angle or more.

In operation S1130 or an operation of determining a tilt direction of a terminal, the controller 110 may determine a tilt direction of the mobile terminal 100. The controller 110 may perform operation S1135 if the tilt direction corresponds to a forward direction, and perform operation S1160 if the tilt direction does not correspond to a forward direction (i.e., corresponds to a backward direction).

In operation S1135 or a scroll-up operation, the controller 110 may scroll up the screen.

In operation S1140 or an operation of determining a tilt of a terminal, the controller 110 may determine whether the mobile terminal 100 is tilted in the opposite direction to the tilt direction determined before the screen scroll-up, using the sensor module 170.

In operation S1145 or an operation of determining a tilt angle of a terminal, the controller 110 may determine whether the mobile terminal 100 is tilted at a threshold angle or more. The threshold angle may be an angle by which the mobile terminal 100 may return to the stop range O, or may be the same as the threshold angle in operation S1125. The controller 110 may perform operation S1150 if the mobile terminal 100 is tilted at a threshold angle or more, and repeat operation S1140 if the mobile terminal 100 is not tilted at an angle or more.

In operation S1150 or an operation of determining a tilt direction of a terminal, the controller 110 may determine a tilt direction of the mobile terminal 100. The controller 110 may perform operation S1155 if the tilt direction corresponds to a backward direction, and perform operation S1140 if the tilt direction does not correspond to a backward direction (i.e., corresponds to a forward direction). Alternatively, operation S1150 may be omitted.

In operation S1155 or a scroll stop operation, the controller 110 may stop the scroll-up of the screen.

In operation S1160 or a scroll-down operation, the controller 110 may scroll down the screen.

In operation S1165 or an operation of determining a tilt of a terminal, the controller 110 may determine whether the mobile terminal 100 is tilted in the opposite direction to the tilt direction determined before the screen scroll-up, using the sensor module 170.

In operation S1170 or an operation of determining a tilt angle of a terminal, the controller 110 may determine whether the mobile terminal 100 is tilted at a threshold angle or more. The threshold angle may be an angle by which the mobile terminal 100 may return to the stop range O, or may be the same as the threshold angle in operation S1125. The controller 110 may perform operation S1175 if the mobile terminal 100 is tilted at a threshold angle or more, and repeat operation S1165 if the mobile terminal 100 is not tilted at a threshold angle or more.

In operation S1175 or an operation of determining a tilt direction of a terminal, the controller 110 may determine a tilt direction of the mobile terminal 100. The controller 110 may perform operation S1155 if the tilt direction corresponds to a forward direction, and perform operation S1165 if the tilt direction does not correspond to a forward direction (i.e., corresponds to a backward direction). Alternatively, operation S1175 may be omitted.

Figure 24:
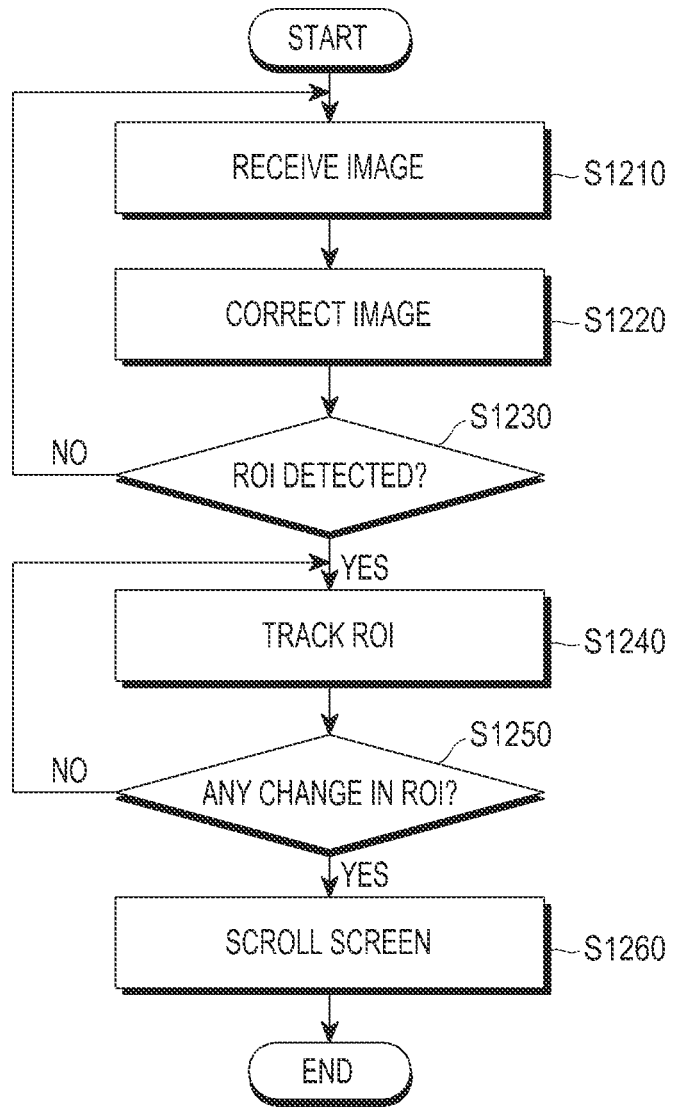
FIG. 24 is a flowchart illustrating a screen scroll method in a vision scroll mode according to the third embodiment of the present disclosure.

FIG. 24 is a flowchart illustrating a screen scroll method in a vision scroll mode according to the third embodiment of the present disclosure.

The screen scroll method may be applied to real-time images or real-time image frames.

Referring to FIG. 24, the controller 110 may receive a real-time image from the camera module 150 in operation S1210 or an image receiving operation. Alternatively, the controller 110 may receive a real-time image from the storage unit 175, if real-time images captured by the camera module 150 are stored in the storage unit 175 in advance.

Figure 25A:
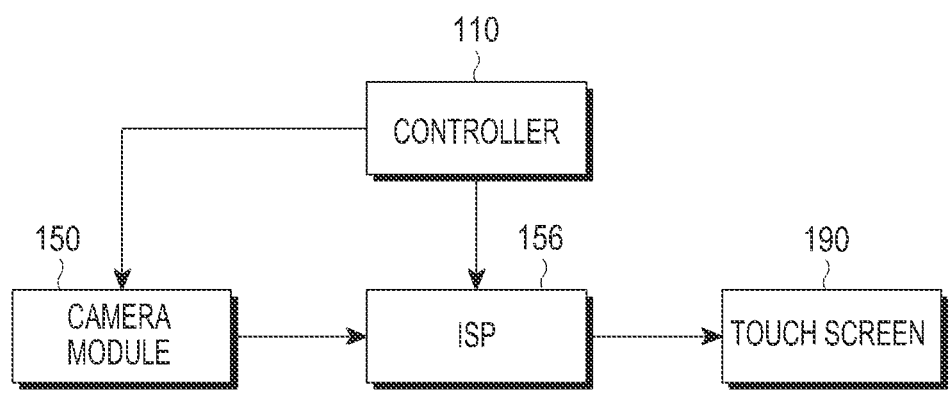
FIGS. 25A and 25B illustrate a screen scroll method in a vision scroll mode according to the third embodiment of the present disclosure.
Figure 25B:
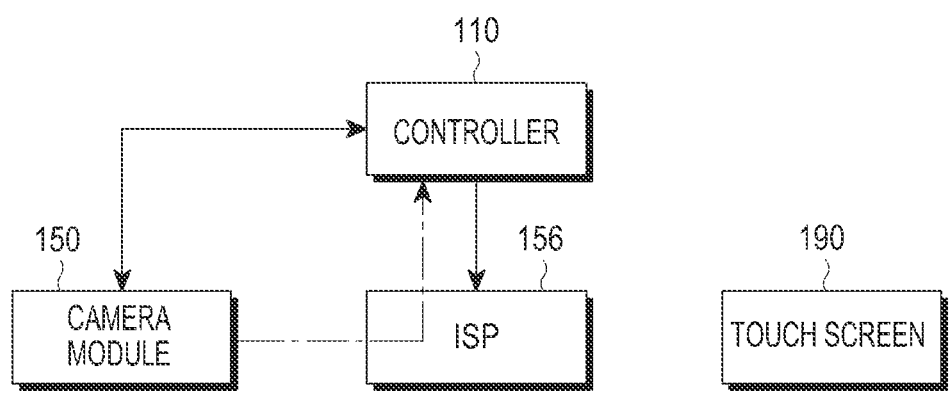

FIGS. 25A and 25B illustrate a screen scroll method in a vision scroll mode according to the third embodiment of the present disclosure.

Referring to FIG. 25A, the mobile terminal 100 illustrated in FIG. 1 may further include an Image Signal Processor (ISP) 156. Notably, the mobile terminal of FIG. 25A processes images captured by the camera module 150 in a non-vision scroll mode.

The ISP 156 may receive real-time images captured by the camera module 150, process the images (i.e., convert the images into high-quality images) according to the screen characteristics (size, image quality, resolution or the like) of the touch screen 190 or the screen characteristics of another display unit, and output the high-quality images to the touch screen 190.

The touch screen 190 may display the high-quality images received from the ISP 156.

The controller 110 may control the camera module 150 and/or the ISP 156 to perform the image processing.

Referring to FIG. 25B, the mobile terminal processes images captured by the camera module 150 in a vision scroll mode.

The controller 110 may control the camera module 150 not to output real-time images to the ISP 156, or control the ISP 156 not to process real-time images received from the camera module 150. The controller 110 may receive non-ISP processed images, which have not undergone ISP, from the camera module 150, the ISP 156, or the storage unit 175.

The controller 110 may control (or cause) the camera module 150 to output high-quality (or high-resolution) images for screen display in a non-vision scroll mode and output low-quality (or low-resolution) images in a vision scroll mode. For example, under control of the controller 110, the camera module 150 may output full-pixel images in the non-vision scroll mode, and output down-sampled images in the vision scroll mode. The down-sampled image has a smaller number of pixels than the full-pixel image.

In an alternative case, the controller 110 may control the camera module 150 to output full-color images for screen display in the non-vision scroll mode and output monochrome or gray-scale image images in the vision scroll mode.

The controller 110 may perform the screen scroll method using non-ISP processed images which may contribute to minimization of power consumption, instead of using normal high-quality images that may require higher power consumption. For example, the controller 110 may use down-sampled non-ISP processed low-quality (or low-resolution) gray images in the vision scroll mode.

Since much of the power consumed by the mobile terminal 100 may be consumed by the ISP 156, the controller 110 may use non-ISP processed images in order to minimize the power consumption while continuously enabling the camera module 150, for screen scroll.

Alternatively, the controller 110 may perform the screen scroll method using the ISP processed images.

Referring again to FIG. 24, the controller 110 may correct non-IPS processed images in operation S1220 or an image correction operation. The image correction may include at least one of lighting correction for making the image robust against a change in ambient lighting, noise reduction for minimizing the influence of noise, and detail enhancement (or sharpness correction) for images blurred due to the reduction in noise.

The controller 110 may correct the current image (or the target image) by analyzing at least one previous image(s) (or the images which were captured before the target image is captured). The controller 110 may determine a difference between the previous image and the current image, and may correct the current image based on the previous image if the difference is less than a threshold, and correct the current image without being based on the previous image if the difference is greater than or equal to a threshold. For example, the controller 110 may remove noise from the current image depending on information about the noise analyzed for the previous image if the difference between the images is less than the threshold, and analyze and remove noise from the current image without using information about the noise analyzed for the previous image if the difference between the images is greater than or equal to the threshold. For example, in a case where correction is performed for five images, on the assumption that the difference between images is less than a threshold, the controller 110 may correct $2^{nd}$ to $5^{th}$ images depending on the noise information analyzed for the $1^{st}$ image, making it possible to reduce the image correction time, compared to when the controller 110 performs noise analysis for each image. The controller 110 may correct the $5^{th}$ image using analysis information for the $1^{st}$ to $4^{th}$ images, thereby increasing the correction accuracy. When correcting noise in units of n images, the controller 110 may correct noise of an n-th image using noise analysis information for $1^{st}$ to n-th images, and correct noise of an (n+1)-th image using noise analysis information for $2^{nd}$ to (n+1)-th images. If the difference between an (n+2)-th image and an (n+1)-th image is greater than or equal to a threshold, the controller 110 may perform noise analysis and correction for the (n+2)-th image without being based on the previous images, and correct noise of an (n+3)-th image using noise analysis information for (n+2)-th to (n+3)-th images.

Operation S1220 is optional.

In operation S1230 or an interest region determination operation, the controller 110 may determine whether an interest region (or Region of Interest (ROI)) is detected from the image.

Figure 26:
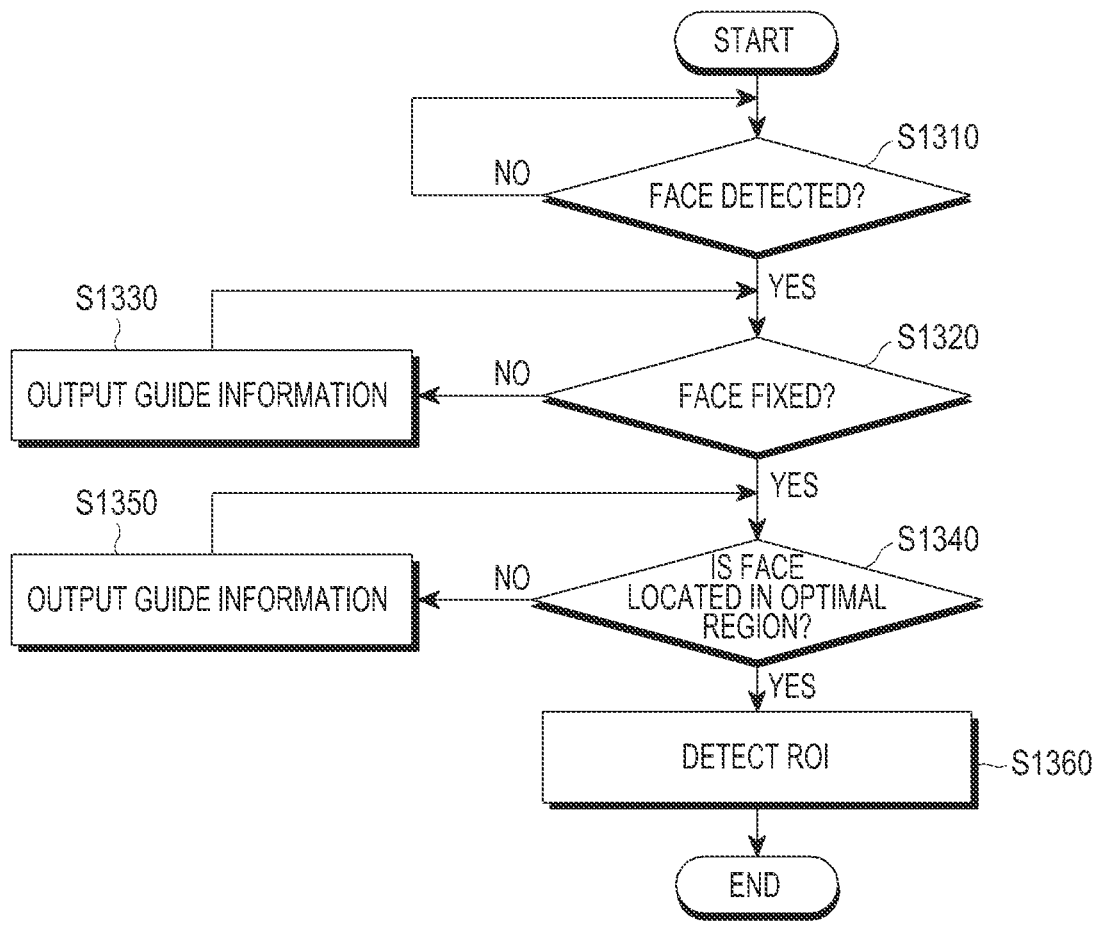
FIG. 26 is a flowchart illustrating operations of an interest region determination operation according to an embodiment of the present disclosure.

FIG. 26 is a flowchart illustrating operations of an interest region determination operation according to an embodiment of the present disclosure.

Referring to FIG. 26, the controller 110 may determine whether a face is detected from the image in operation S1310 or an operation of determining whether a face is detected.

The face detection may be performed using a normal face detection method, for which face detection technology is used, which is based on the contour of the face, the color and/or texture of the face skin, templates, or the like. For example, the controller 110 may detect an image region (i.e., a detected subject) matching the registered subject, by performing a process of matching feature points of the registered subject image with the feature points detected from the input image. The controller 110 may perform face learning using multiple face images, and detect a face from the input image based on the accumulated face learning data.

In operation S1320 or an operation of determining whether a face is fixed, the controller 110 may determine whether the face moves in the image. The controller 110 may determine whether the face is fixed, for initialization of the screen scroll method, because the controller 110 may not determine whether the user intends to scroll the screen, even though the face is detected from the image.

Figure 27A:
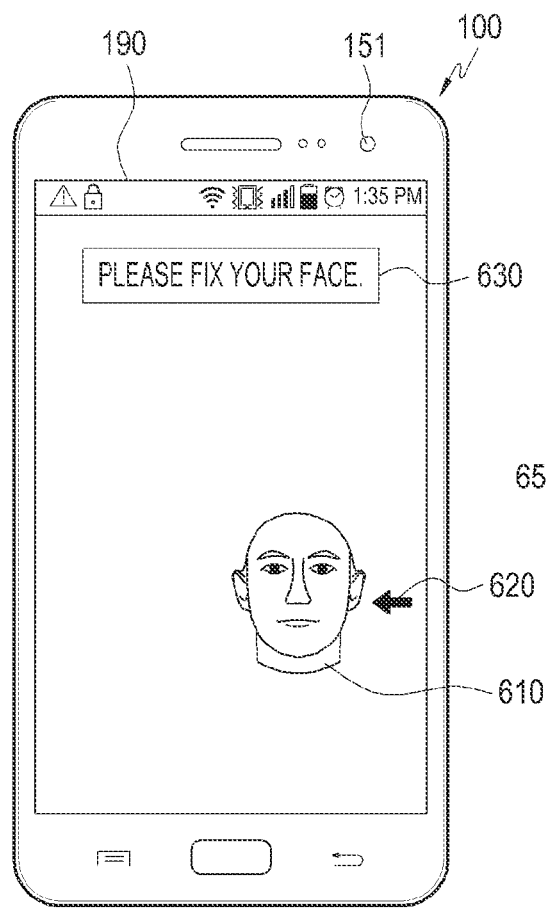
FIGS. 27A, 27B, 28A, 28B and 29 illustrate operations of an interest region determination operation according to an embodiment of the present disclosure.

FIGS. 27A, 27B, 28A, 28B and 29 illustrate operations of an interest region determination operation according to an embodiment of the present disclosure;

Referring to FIG. 27A, a face 610 of the user moves in operation 620 from the right to the left in his/her viewing direction.

The controller 110 may perform operation S1340 if the face 610 is fixed, and perform operation S1330 if the face is not fixed.

In operation S1330 or an operation of outputting first guide information, the controller 110 may output guide information for instructing the user to fix his/her face. Outputting guide information may include displaying visual guide information such as images and texts, or outputting acoustic guide information such as voice.

Referring again to FIG. 27A, the controller 110 may display, on the touch screen 190, guide information 630 such as 'Please Fix Your Face' and 'Please Fix Your Face for Screen Scroll'.

In operation S1340 or an operation of determining a position of a face, the controller 110 may determine whether the face is located in an optimal region.

The controller 110 may set the optimal region on the touch screen 190 taking into account a view angle and/or position of the first camera 151, and a direction of the mobile terminal 100.

The controller 110 may determine whether the face is located in the optimal region.

Figure 27B:
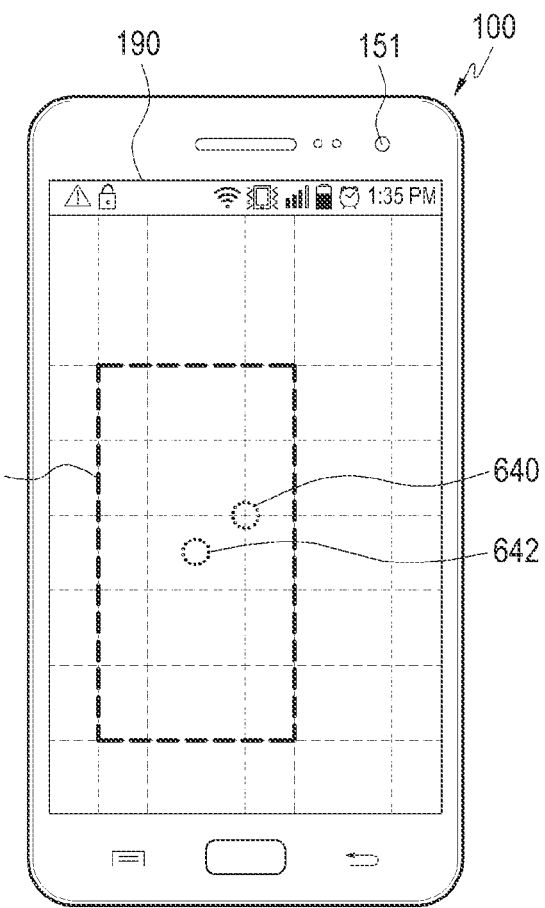

Referring to FIG. 27B, an optimal region 650 may be set such that its center 642 may be spaced apart from the center 640 of the touch screen 190 in a direction further from the first camera 151. Since the first camera 151 is located on the upper right of the mobile terminal 100, the center 642 of the optimal region 650 may be spaced apart from the center 640 of the touch screen 190 in a lower left direction. If the first camera 151 is located on the upper left of the mobile terminal 100, the center 642 of the optimal region 650 may be spaced apart from the center 640 of the touch screen 190 in a lower right direction.

The controller 110 may perform operation S1360 if the face 610 is located in the optimal region 650, and perform operation S1350 if the face 610 is not located in the optimal region 650.

In operation S1350 or an operation of outputting second guide information, the controller 110 may output guide information for instructing the user to move so that the face 610 may be located in the optimal region 650, if the face 610 is not located in the optimal region 650. Outputting guide information may include displaying visual guide information such as images and texts, or outputting acoustic guide information such as voice. Operations S1340 and S1350 are optional.

Figure 28A:
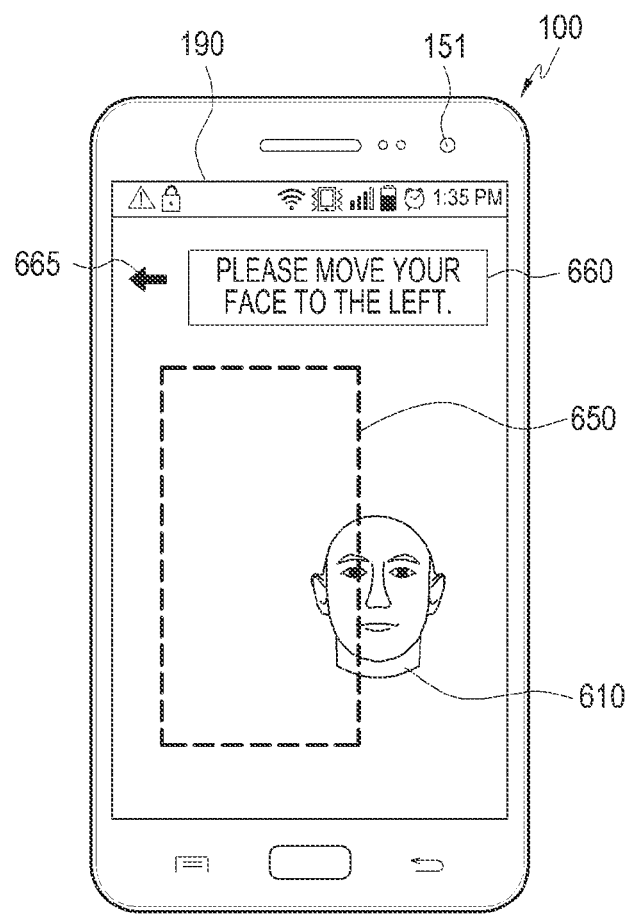

Referring to FIG. 28A, the face 610 of the user is out of the optimal region 650. The controller 110 may display, on the touch screen 190, text guide information 660 such as 'Please Move Your Face to the Left', voice guide information (not shown) such as 'Please Move Your Face to the Left', or image guide information 665 such as an arrow.

Figure 28B:
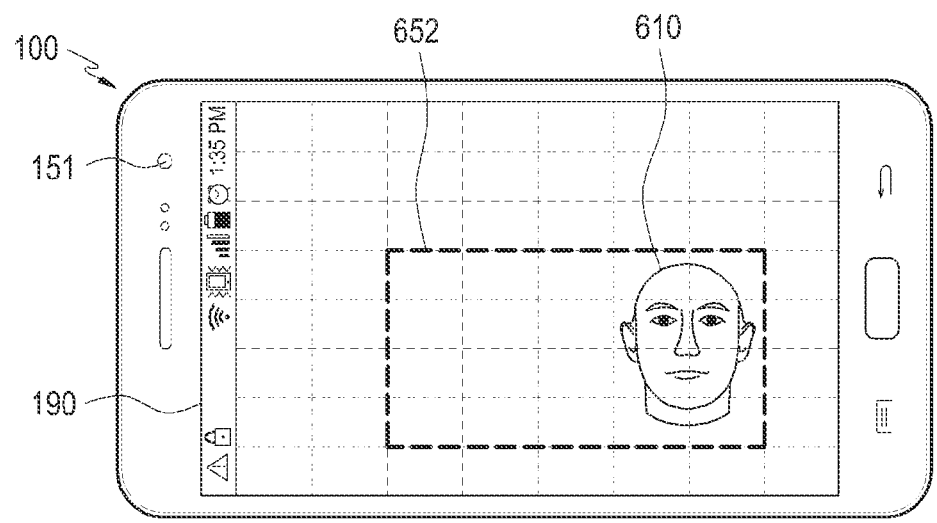

Referring to FIG. 28B, an optimal region 652 may be set to rotate together with rotation of the mobile terminal 100. In an arbitrary direction of the mobile terminal 100, the optimal region 652 may be set such that its center may be spaced apart from the center of the touch screen 190 in a direction further from the first camera 151, or may be set such that the size of the optimal region 652 may be different depending on the direction of the mobile terminal 100.

In operation S1360 or an operation of detecting an interest region, the controller 110 may detect an interest region from the face in the image.

Figure 29:
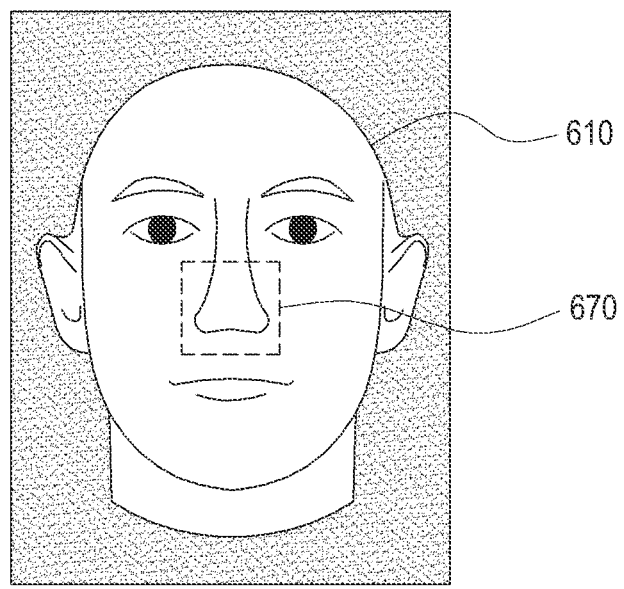

Referring to FIG. 29, the controller 110 may detect an interest region 670 including a nose from the face 610. In other words, the interest region 670 may surround the nose and its center coordinates may be located in the nose.

The accuracy and processing speed for interest region tracking may be increased by setting an interest region that is centered on the nose, which can well express a change in up/down/left/right movement in the face.

In a case where the camera module 150 is located on the upper part of the mobile terminal 100 and the user uses the mobile terminal 100 holding it obliquely, the entire face region may not be included in the view angle of the camera module 150.

In this environment, if the user moves his/her face up and down, a change around each of eyes/nose/mouth may be different. Therefore, if an interest region including information about all the eyes/nose/mouth is used, the estimation accuracy may decrease. Because of the increase in interest region, the mobile terminal 100, which has limited computational power, may have a long processing time that is spent on tracking. Therefore, the mobile terminal 100 may set, as an interest region, the region including the nose, which can well reflect the movement of the face and in which the change in movement significantly appears, in the entire face.

In operation S1240 or an operation of tracking an interest region, the controller 110 may track a change in position of the interest region in the continuously captured images. The controller 110 may track an accumulated change in position of the nose in the continuously captured images.

In operation S1250 or an operation of determining a change in state of an interest region, the controller 110 may determine whether a state of the interest region is changed, based on the change in position of the interest region. The controller 110 may determine whether an accumulated change in position of the interest region exceeds a threshold.

For example, the controller 110 may determine a moving direction of the interest region, and determine that the state of the interest region is changed to one of an up-state, a down-state, a left-state, a right-state and a stop state, if the accumulated change in position in the moving direction exceeds (or is greater than or equal to) a threshold in the moving direction. The up-state, the down-state, the left-state, the right-state and the stop state may correspond to a scroll-up (or up-scroll) event, a scroll-down (or down-scroll) event, a scroll-left (or left-scroll) event, a scroll-right (or right-scroll) event, and a stop event, respectively.

The change in state of the interest region may correspond to occurrence of an event.

A change in position of the nose, which is associated with the change in state of the interest region (or a type of an event), can be understood from FIG. 16 illustrating a change in position of eyes.

The controller 110 may perform operation S1260 if there is a change in state of the interest region in operation S1250, and continues operation S1240 if there is no change in state of the interest region.

In operation S1260 or a screen scroll operation, the controller 110 may scroll the screen in a direction corresponding to the change in state.

The controller 110 may continuously update tracking information for the interest region, determine an up/down/left/right/stop state of the interest region for controlling screen scroll by analyzing the updated information, and perform screen scroll corresponding to the determined state. An example of determining an up/down/stop state by tracking the interest region including the nose will be considered herein below, and similarly, a left/right/stop state may be determined by analyzing a change in left/right movement of the interest region including the nose.

Figure 30:
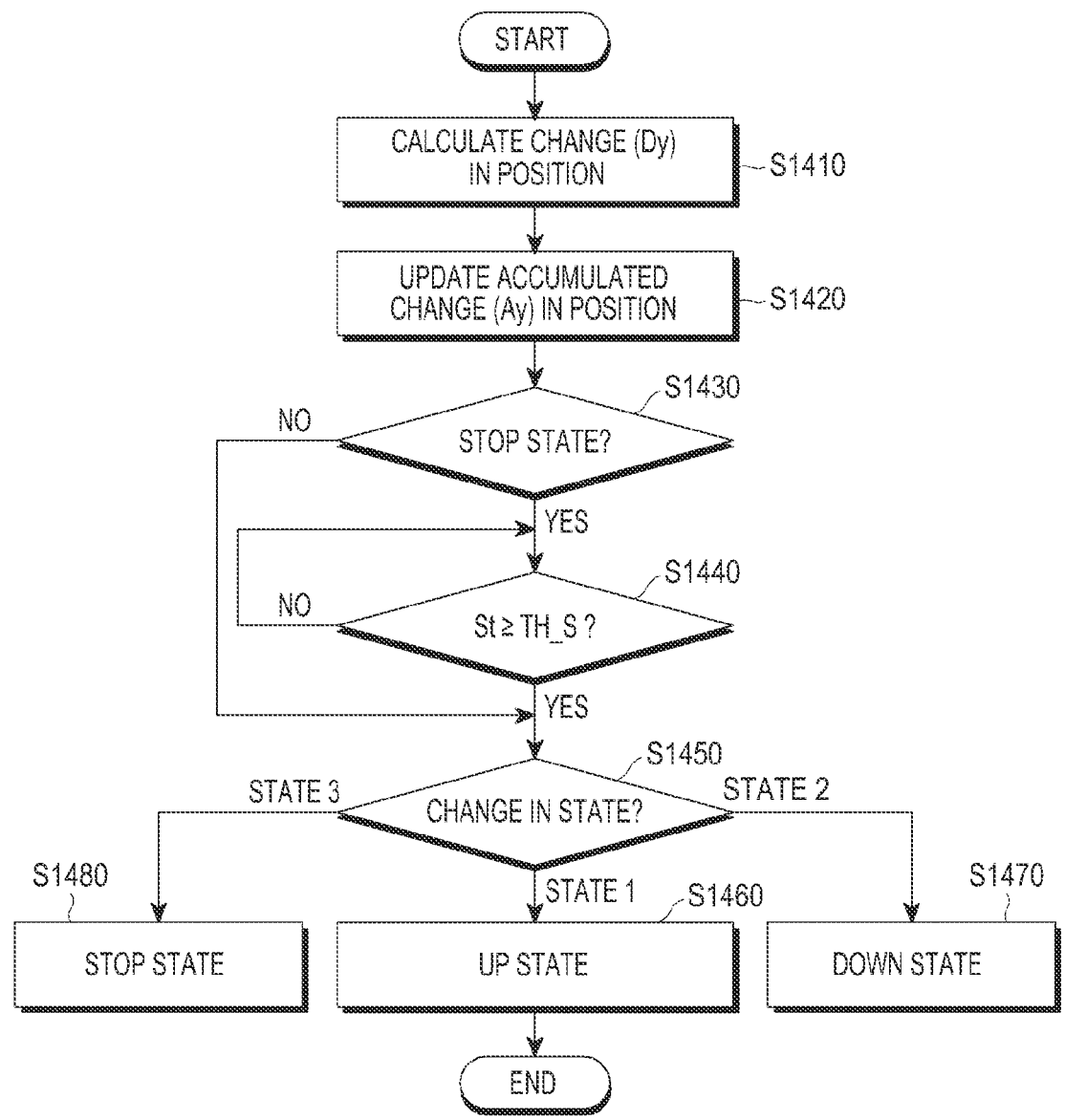
FIG. 30 is a flowchart illustrating operations of tracking an interest region and determining a change in state of an interest region according to an embodiment of the present disclosure.

FIG. 30 is a flowchart illustrating operations of tracking an interest region and determining a change in state of an interest region according to an embodiment of the present disclosure.

Referring to FIG. 30, the interest region is initially assumed to be in a stop state.

In operation S1410 or an operation of calculating a change Dy in position, the controller 110 may calculate a change Dy in position between the previous interest region and the current interest region. In other words, the controller 110 may calculate a change in position of an interest region in the current image and the previous image.

If a moving speed of the interest region is very low, movement between two interest regions may be negligible, so a change in position may be less than a pixel unit. In this case, therefore, it is not possible to track the accurate movement of the interest region. In this situation, the mobile terminal 100 may undergo performance degradation in tracking movement of the interest region.

The controller 110 may set a period 'n', and accumulate a change in position of an interest region between two consecutive interest regions for the period 'n'. For example, the controller 110 may accumulate a change in position between a first interest region and a second interest region, and a change in position between the second interest region and a third interest region. If the accumulated value is less than or equal to a threshold TH_n, the controller 110 may additionally calculate a change in movement between the current interest region (i.e., 2n-th interest region) and the previous n-th interest region, and add it to (or substitute it for) the change Dy in position. By doing so, the controller 110 may accurately track a slow moving face. If there is no significant difference in position between neighboring frames during a specific period, a change Dy in position of the interest region including a nose in a (t−n)-th image and a t-th image (where t=2n) may be calculated as follows:

$$Dy = P(t-n) - P(t)$$

where P(t−n) denotes the center coordinates of the interest region in a (t−n)-th frame, and P(t) denote the center coordinates of the interest region in a t-th frame. Although the change Dy in position is represented herein as a change in center coordinates, the change Dy in position may be generalized and represented as a change in any position (or pixel) in the interest region.

In operation S1420 or an operation of updating or calculating an accumulated change Ay in position, the controller 110 may update an accumulated change Ay in position by adding up the change Dy in position, which was calculated in each period n. In other words, the controller 110 may calculate an accumulated change Ay in position from the previous state to the current state of the interest region. The previous state may be an up-state, a down-state, a left-state or a right-state.

The change Dy in position may have a positive or negative sign. For example, the change Dy in position may have a positive value for up movement (or up-state), and a negative value for down movement (or down-state).

In operation S1430 or an operation of determining whether the interest region is in a stop state, the controller 110 may determine whether the state of the interest region corresponds to a stop state.

The storage unit 175 may store previous state information in advance, and the previous state information may include previous state information of the interest region such as an up-state or a down-state, and an accumulated change Ay in position in the previous state.

For example, when the previous state is an up-state, the controller 110 may determine that the state of the interest region is a stop state, if the current accumulated change Ay in position decreases by a threshold TH_Stop. On the other hand, when the previous state is a down-state, the controller 110 may determine that the state of the interest region is a stop state, if the current accumulated change Ay in position increases by a threshold TH_Stop.

The stop-state threshold TH_Stop may be set to be less than or equal to an up-state threshold TH_Aup for determining an up-state, and a down-state threshold TH_Adown for determining a down-state.

Figure 31A:
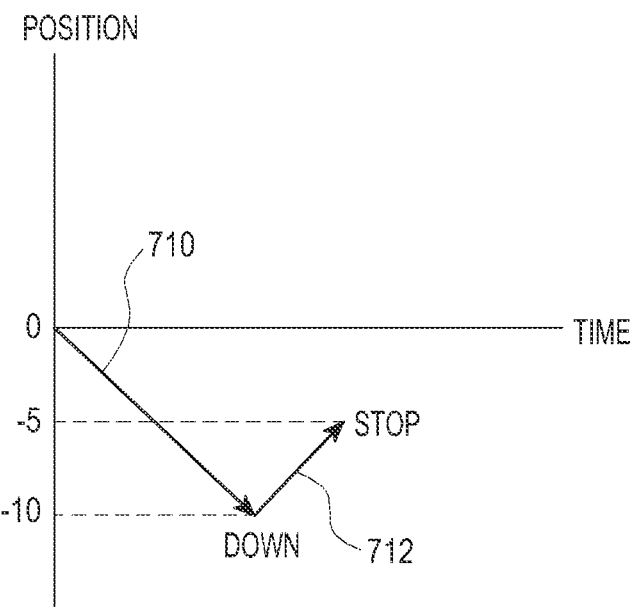
FIGS. 31A, 31B, and 32 illustrate changes in state of an interest region according to an embodiment of the present disclosure.
Figure 31B:
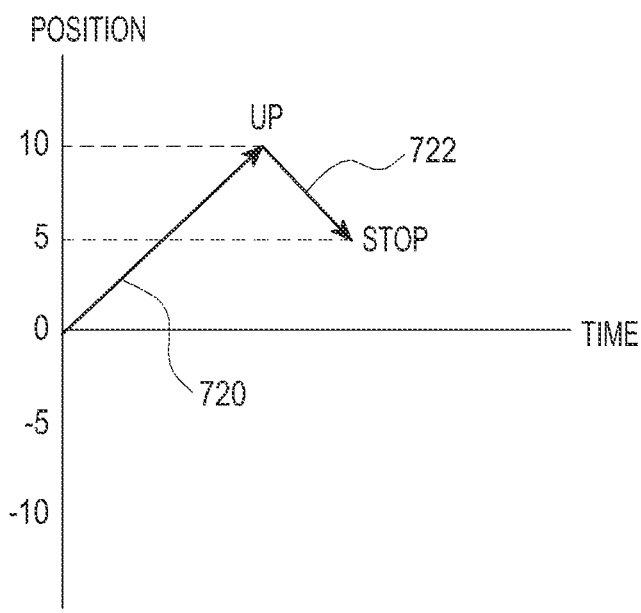
Figure 32:
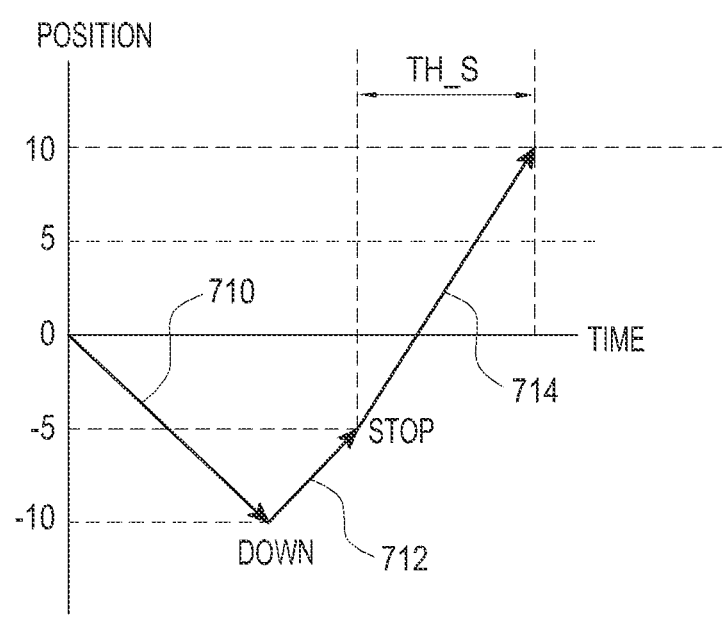

FIGS. 31A, 31B, and 32 illustrate changes in state of an interest region according to an embodiment of the present disclosure.

Referring to FIGS. 31A and 31B, the horizontal axis represents time, and the vertical axis represents a vertical position. It will be assumed that a stop-state threshold TH_Stop, a down-state threshold TH_Adown, and an up-state threshold TH_Aup are set to 5, −10 and 10, respectively. Their units may be millimeters (mm), pixels or the like.

In FIG. 31A, the controller 110 may determine the state of the interest region as a down-state, if the interest region has moved down by 10 from the initial position (see 710). Thereafter, the controller 110 may determine the state of the interest region as a stop-state, if the interest region has moved up by 5 from the down position (see 712).

Referring to FIG. 31B, the controller 110 may determine the state of the interest region as an up-state, if the interest region has moved up by 10 from the initial position (see 720). Thereafter, the controller 110 may determine the state of the interest region as a stop-state, if the interest region has moved down by 5 from the up position (see 722).

The controller 110 may perform operation S1440 if the state of the interest region is a stop-state, and perform operation S1450 if the state of the interest region is not a stop-state.

In operation S1440 or an operation of determining a stop time, the controller 110 may determine a duration (i.e., stop time) of the stop state, and maintain the stop state until the stop time St reach a threshold TH_S. The stop time St may be replaced with the number of image frames. For example, if an image frame rate is 10 frames per second, the threshold may be set as 3 to 5 frames.

Referring again to FIGS. 11A to 11C, for example, when the user moves his/her face to read details of the content such as the contact list 210 while stopping it as in FIG. 11B after scrolling details of the contact list 210 as in FIG. 11A or 11C, the contact list 210 should not be scrolled, but it is difficult to distinguish an action of performing scroll from an action of reading details of the content.

Therefore, in determining the up/down/left/right/stop states to precisely operate the scroll by distinguishing these two actions, the controller 110 may not only use the threshold, but also maintain the stop state for a time or during a number of frames.

As described below, if conditions determined as up/down/left/right states are maintained for a time or during a number of frames, they may be finally determined as up/down/left/right states.

Referring to FIG. 32, in a case where the controller 110 maintains the stop state for a time, the controller 110 may continuously calculate an accumulated change Ay in position after a change from a down-state (see 710) to a stop state (see 712), but the controller 110 may not make a state change even though the accumulated change Ay in position exceeds an up-state threshold TH_Aup of 10 from the stop position (see 714). In other words, the controller 110 may continuously maintain the stop state without determining whether the accumulated change Ay in position is greater than or equal to a threshold TH_Aup (i.e., whether the state is changed), until the stop time St is greater than or equal to a threshold TH_S.

The controller 110 may perform operation S1450 if the stop time St has reached the threshold TH_S, and repeats operation S1440 if the stop time St has failed to reach the threshold TH_S.

In operation S1450 or an operation of determining a change in state, the controller 110 may determine whether the state of the interest region is an up-state, a down-state or a stop state depending on the conditions that the state of the interest region satisfies. The stop time St and the threshold TH_S may be defined not only as the time unit, but also as the number of frames that the camera may process for a specific time.

In operation S1460, the controller 110 may determine the state of the interest region as an up-state, if the state of the interest region satisfies first conditions.

The first condition may be Ay≥TH_Aup and FC_up≥TH_Fup. A frame count FC_up is counted when an accumulated change Ay in position is greater than or equal to an up-state threshold TH_Aup and the change Dy in position is 0, or falls within a range of numerical values.

In operation S1470, the controller 110 may determine the state of the interest region as a down-state, if the state of the interest region satisfies second conditions.

The second conditions may be Ay≤TH_Adown and FC_down≥TH_Fdown. A frame count FC_down is counted when an accumulated change Ay in position is less than or equal to TH_Adown and the change Dy in position is less than 0, or falls within a range of numerical values.

Due to the use of the stop time or the frame count, it is possible to prevent unintended scroll from occurring by movement of the face that looks at the top or bottom of the screen to read details of the content after the user changes to the stop state by moving his/her face up while the screen is scrolled in a down-state.

In operation S1480, the controller 110 may determine the state of the interest region as a stop state, if the state of the interest region satisfies third conditions. The third conditions may be conditions other than the first and second conditions. In other words, the controller 110 may determine the state of the interest region as a stop state, if the state of the interest region does not satisfy any of the first and second conditions.

In a case where the controller 110 is set to maintain the stop state for a stop-state threshold TH_S, the controller 110 needs to stop for a specific time at all times in a stop state, so a state change for scroll-up and scroll-down may not naturally operate. In order to address this problem, stop time conditions may be released when the accumulated change Ay in position is greater than or equal to a second up-state threshold TH_Aup2 which is greater than TH_Aup, or is less than or equal to a second down-state threshold TH_Adown2 which is less than TH_Adown, so that the up-state and the down-state may be softly switched.

In this case, the first conditions may be Ay≥TH_Aup2 and FC_up≥TH_Fup and the second conditions may be Ay≤TH_Adown2 and FC_down≥TH_Fdown.

The controller 110 may utilize the previous state information to determine a change from the stop state to the up/down-state. In order to determine a change from the stop state to the up/down-state utilizing the previous state information, the controller 110 may consider four different cases: up-state→stop state→up-state, down-state→stop state→down-state, up-state→stop state→down-state, and down-state→stop state→up-state.

The controller 110 may dynamically change thresholds TH_Aup and TH_Adown for determining the current state based on the previous state indicating the up/down-state and an accumulated change Ay in position of the previous state.

If a state change takes place (up-state→stop state→up-state, down-state→stop state→down-state) in the same direction, movement of the face may be small, so a change Dy in position of the interest region may be small. Therefore, if the state change takes place in the same direction, the controller 110 may use a fixed threshold, and may dynamically allocate thresholds TH_Aup and TH_Adown of the current state depending on any one of one or more reference ranges, to which an accumulated change Ay in position of the previous state belongs.

Figure 33A:
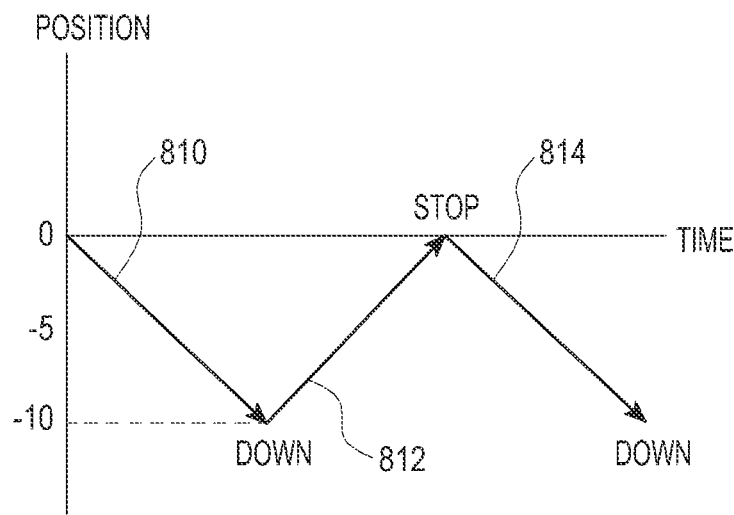
FIGS. 33A and 33B illustrate dynamic allocation of down-state thresholds for state change in the same direction according to an embodiment of the present disclosure.
Figure 33B:
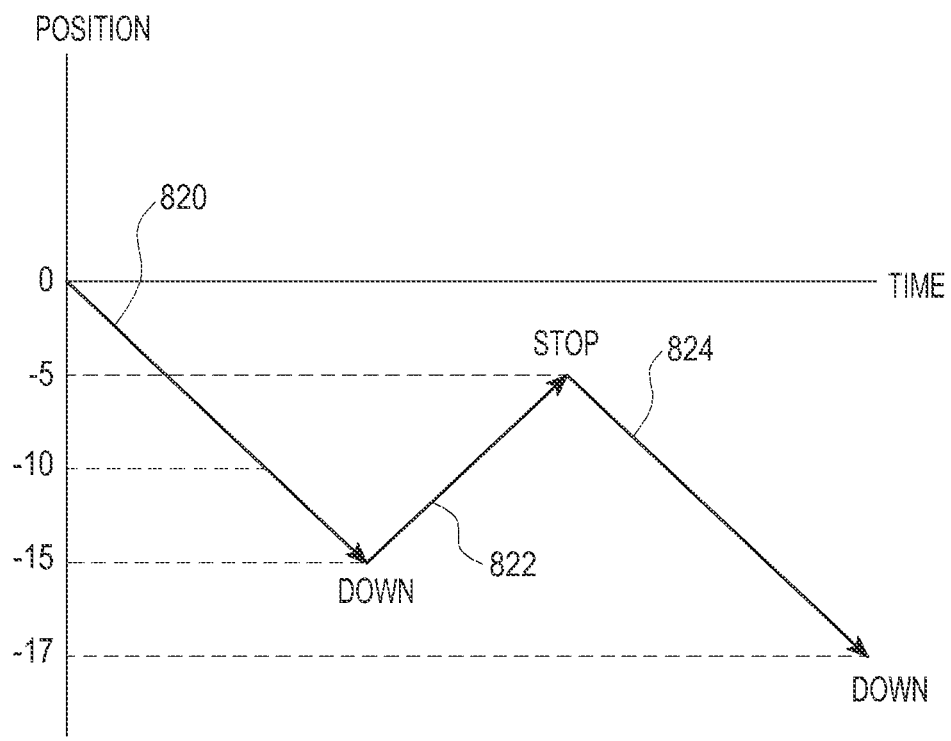

FIGS. 33A and 33B illustrate dynamic allocation of down-state thresholds for state change in the same direction according to an embodiment of the present disclosure.

Referring to FIGS. 33A and 33B, the stop-state threshold TH_Stop and the initial down-state threshold TH_Adown are assumed to be set to 5 and −10, respectively.

In FIG. 33A, the controller 110 may determine the state of the interest region as a down-state if the interest region has moved down by 10 from an initial position (see 810). Thereafter, the controller 110 may determine the state of the interest region as a stop state if the interest region has moved up by 10 exceeding 5 from the down position (see 812). In this case, the controller 110 may maintain the down-state threshold TH_Adown intact. Thereafter, the controller 110 may determine the state of the interest region as a down-state if the interest region has moved down by 10 from the stop position (see 814).

In FIG. 33B, the controller 110 may determine the state of the interest region as a down-state, if the interest region has moved down by 10 or more from the initial position (see 820). Actually, however, the interest region has moved down by 15 (i.e., an accumulated change in position of the interest region is 15) at the time the controller 110 determines the state of the interest region as a down-state. In this case, a threshold TH_Adown for determining a down-state may be changed to a value of −5, which is less in absolute value than the existing value of −10. After determining the state of the interest region as a stop state as the interest region has moved up by 10 exceeding 5 from the down position (see 822), the controller 110 may determine the state of the interest region as a down-state, if the interest region moves down by reflecting the changed threshold of −5, i.e., if the interest region moves down by 5 (see 824). In other words, the controller 110 may decrease a threshold for the accumulated change in position for determining the next up/down-state, if an absolute value of an accumulated change in position of the previous state is greater than an absolute value of a threshold.

As a result, the controller 110 may dynamically change the up/down-state threshold depending on any one of multiple ranges (e.g., 0~10 and −10~−15), to which an accumulated change Ay in position of the previous state belongs.

If a state change takes place in a direction different from that of the previous state, movement of the face may be significant, so a change Dy in position of the interest region may be significant. Therefore, when using the fixed thresholds TH_Aup and TH_Adown, the controller 110 may have difficulty in consistently determining the up/down-state. For example, in a case where the controller 110 scrolls the screen depending on the up/down-state using the fixed thresholds, a reference point may move if the user continuously performs scrolling after the scroll stop state was set when the user was looking at the center of the screen. Thus, at a certain time, the user may need to look at the top or bottom of the screen in order to stop the screen scroll. Therefore, in order to minimize the movement of the reference point, the controller 110 may dynamically change the thresholds used to determine the current up/down-state based on the previous state and the accumulated change Ay in position of the previous state.

Figure 34:
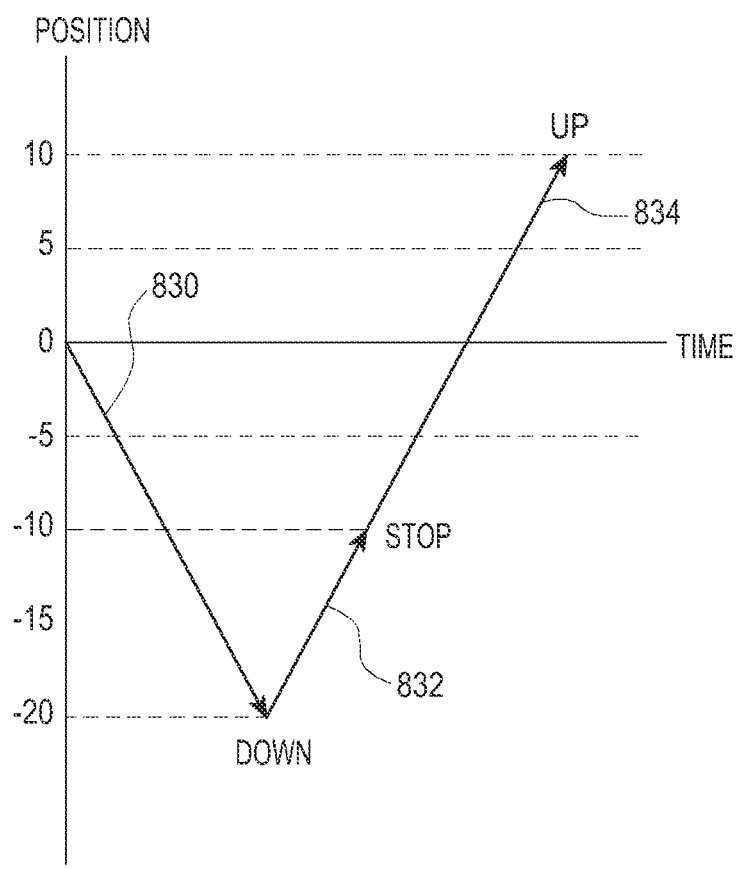
FIG. 34 illustrates dynamic allocation of down-state thresholds for state change in a different direction according to an embodiment of the present disclosure.

FIG. 34 illustrates dynamic allocation of down-state thresholds for state change in a different direction according to an embodiment of the present disclosure.

Referring to FIG. 34, the stop-state threshold TH_Stop and the initial down-state threshold TH_Adown are assumed to be set to 5 and −10, respectively.

The controller 110 may determine the state of the interest region as a down-state, if the interest region has moved down by 20 exceeding 10 from the initial position (see 830). Thereafter, the controller 110 may determine the state of the interest region as a stop state if the interest region has moved up by 10 exceeding 5 from the down position (see 832). In this case, the controller 110 may change the up-state threshold TH_Aup from 10 to 20. In other words, the controller 110 may increase a threshold for the accumulated change in position for the current state if a threshold for an accumulated change in position of the previous state is greater than an absolute value of a threshold.

In other words, the controller 110 may increase a threshold for the accumulated change in position for determining the current state if an absolute value of an accumuchange in position of the previous state is greater than an absolute value of a threshold. The controller 110 may determine the state of the interest region as an up-state if the interest region has moved up by 20 exceeding 10 from the stop position (see 834).

As a result, the controller 110 may dynamically change the up/down-state threshold depending on any one of multiple ranges, to which an accumulated change Δy in position of the previous state belongs.

Although a touch screen is given as a typical example of a display unit for displaying a screen in the above-described embodiments, the normal display unit without a touch-sensing function such as Liquid Crystal Display (LCD), Organic Light Emitting Diodes (OLED), Light Emitting Diodes (LED), or the like may also be used instead of the touch screen.

Although one of multiple scroll modes is selected in the foregoing embodiments by way of example, a context awareness-based screen scroll method according to the present disclosure may directly perform a motion scroll mode upon detecting a registered subject such as a face, as described with reference to FIG. 18 or 23.

Although the scroll is controlled depending on the determination of the up/down/left/right/stop states in the foregoing embodiments, the present disclosure may be applied to a screen or GUI control method depending on the running program. As an example, embodiments of the present disclosure may be applied to execute zoom-in/out commands depending on the up/down/left/right/stop states in a camera shooting mode, and may be applied to execute zoom-in/out commands and left/right rotation commands in an image viewer. As another example, embodiments of the present disclosure may be applied to execute forward/backward commands and volume up/down commands for video/audio playback. As a further example, embodiments of the present disclosure may be applied to move up/down/left/right an icon that indicates a position of a focus on the screen to allow the user to select the focus position during camera shooting.

It can be appreciated that embodiments of the present disclosure may be implemented by hardware, software or a combination thereof. The software may be stored in volatile or non-volatile storage (e.g., erasable/re-writable ROM), memory (e.g., RAM, memory chip, memory device, or memory Integrated Circuit (IC)), or optically or magnetically recordable machine (or computer)-readable storage media (e.g., Compact Disk (CD), Digital Versatile Disk (DVD), magnetic disk, or magnetic tape). A storage unit mounted in a mobile terminal may be an example of the machine-readable storage media suitable to store a program or programs including instructions for implementing embodiments of the present disclosure. Therefore, the present disclosure may include a program including codes for implementing the apparatus or method as defined by the appended claims and their equivalents, and machine-readable storage media storing the program.

The mobile terminal may receive and store the program from a program server, to which the mobile terminal is connected by wires or wirelessly. The program server may include a memory for storing a program including instructions for allowing the mobile terminal to implement a set context awareness-based screen scroll method, and storing information needed for the context awareness-based screen scroll method, a communication unit for performing wired/wireless communication with the mobile terminal, and a controller for transmitting the program to the mobile terminal at the request of the mobile terminal or automatically.

As is apparent from the foregoing description, according to embodiments of the present disclosure, the mobile terminal may provide a scroll mode suitable to the surrounding circumstances, and perform screen scroll based on the movement of a subject and the terminal, allowing a user to more conveniently scroll a screen with simple manipulation.

In addition, the mobile terminal may prevent unintended scroll errors by performing a vision scroll mode or a motion scroll mode only upon detecting a registered subject.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A context awareness-based screen scroll method, the method comprising:
 determining a tilt direction of a terminal;
 if the tilt direction corresponds to a forward direction, scrolling up a screen of the terminal;
 if the tilt direction corresponds to a backward direction opposite of the forward direction, scrolling down the screen of the terminal;
 determining if ambient illuminance of the terminal is greater than or equal to a threshold and determining if the terminal is stationary; and
 if the terminal is stationary and if the ambient illuminance is greater than or equal to the threshold, performing a screen scroll mode,
 wherein a scroll speed increases as a tilt angle of the terminal increases.

2. The method of claim 1,
 wherein the screen scroll mode includes at least one of a vision scroll mode based on a camera, or a voice scroll mode based on an audio input/output module.

3. The method of claim 2,
 wherein, if the terminal is stationary and the ambient illuminance of the terminal is greater than the threshold, the screen scroll mode corresponds to the vision scroll mode.

4. The method of claim 2, further comprising at least one of determining whether the terminal is physically connected to a peripheral device and determining whether the terminal is left unattended.

5. The method of claim 2, further comprising:
 determining whether a pre-registered subject is detected from an image captured by the camera; and
 determining whether a change in position of the detected subject exceeds a threshold in continuously captured images.

6. The method of claim 2, further comprising:
 determining whether a pre-registered subject is detected from an image captured by a camera; and
 determining whether a change in a position or an angle of the terminal exceeds a threshold.

7. The method of claim 6, further comprising stopping the screen scroll if the terminal moves or is tilted in a direction toward an initial position or an initial angular position before the change in position.

8. The method of claim 2, wherein the detecting of the information further comprises:
 detecting a face in an image;
 detecting an interest region including a nose from the face; and
 detecting a moving state of the interest region depending on a moving direction of the interest region.

9. The method of claim 8, wherein the moving state of the interest region is determined if the interest region has moved and stopped for a threshold time or during a threshold number of image frames.

10. The method of claim 8, wherein the moving state of the interest region is determined, if the interest region has moved and stopped for a threshold time or during a threshold number of image frames, after the stop state of the interest region was maintained for a threshold time or during a threshold number of image frames.

11. A terminal for providing context awareness-based screen scroll, the terminal comprising:
   a display unit configured to provide a screen; and
   a controller configured to:
      determine a tilt direction of a terminal,
      if the tilt direction corresponds to a forward direction, scroll up the screen,
      if the tilt direction corresponds to a backward direction opposite of the forward direction, scroll down the screen,
      determine if ambient illuminance of the terminal is greater than or equal to a threshold and determine if the terminal is stationary, and
      if the terminal is stationary and if the ambient illuminance is greater than or equal to the threshold, perform a screen scroll mode,
   wherein a scroll speed increases as a tilt angle of the terminal increases.

12. The terminal of claim 11,
   wherein the screen scroll mode includes at least one of a vision scroll mode based on a camera, or a voice scroll mode based on an audio input module.

13. The terminal of claim 12,
   wherein the camera is configured to output a captured image,
   wherein the controller is further configured to execute the screen scroll if a registered subject is detected from the captured image.

14. The terminal of claim 13,
   wherein the position sensor is configured to detect a change in position or angle of the terminal, and
   wherein the controller is further configured to determine whether a change in position or angle of the terminal exceeds a threshold.

15. The terminal of claim 14, wherein the audio input/output module is configured to detect a user's voice.

16. The terminal of claim 15, further comprising an illumination sensor to detect ambient illumination.

17. The terminal of claim 16, wherein the controller is further configured to determine the screen scroll mode based information provided from at least one of the camera, the position sensor, the audio input/output module, and the illumination sensor.

* * * * *